US012614046B2

(12) United States Patent (10) Patent No.: US 12,614,046 B2
Soborski et al. (45) Date of Patent: Apr. 28, 2026

(54) MARK AUTHENTICATION WITH DISTORTION TOLERANCE

(71) Applicant: Sys-Tech Solutions, Inc., Princeton, NJ (US)

(72) Inventors: Michael Soborski, Allentown, NJ (US); Matthias Voigt, Lawrenceville, NJ (US)

(73) Assignee: Sys-Tech Solutions, Inc., Princeton, NJ (US)

( * ) Notice: Subject to any disclaimer, the term of this patent is extended or adjusted under 35 U.S.C. 154(b) by 0 days.

(21) Appl. No.: 18/857,378

(22) PCT Filed: Apr. 21, 2023

(86) PCT No.: PCT/US2023/019484

§ 371 (c)(1),
(2) Date: Oct. 16, 2024

(87) PCT Pub. No.: WO2023/205473

PCT Pub. Date: Oct. 26, 2023

(65) Prior Publication Data

US 2025/0265431 A1 Aug. 21, 2025

Related U.S. Application Data

(60) Provisional application No. 63/333,516, filed on Apr. 21, 2022.

(51) Int. Cl.
G06K 7/14 (2006.01)
G06V 20/00 (2022.01)
H04L 9/32 (2006.01)
(52) U.S. Cl.
CPC ............. G06K 7/146 (2013.01); G06V 20/95 (2022.01); H04L 9/3247 (2013.01)

(58) Field of Classification Search
CPC ....... G06K 7/146; G06V 20/95; H04L 9/3247
See application file for complete search history.

(56) References Cited

U.S. PATENT DOCUMENTS 9,519,942 B2 12/2016 Soborski
9,940,572 B2 4/2018 Soborski
(Continued)

FOREIGN PATENT DOCUMENTS

WO WO 2016/049062 3/2016

OTHER PUBLICATIONS

International Search Report and Written Opinion in International Appln. No. PCT/US2023/019484, mailed on Jun. 16, 2023, 9 pages.
(Continued)

*Primary Examiner* — Tuyen K Vo
(74) *Attorney, Agent, or Firm* — Fish & Richardson P.C.

(57) ABSTRACT

Methods, systems, and apparatus, including medium-encoded computer program products, for mark authentication with distortion tolerance. An electronic signature can be obtained as the data series for a candidate mark. The data series values of the electronic signature can be transformed to generate two or more transformed data series versions of the electronic signature. Hash identifiers for the electronic signature and for the two or more transformed data series versions of the electronic signature can be derived. The hash identifiers can be used to retrieve a set of two or more results from a database of genuine mark signatures. At least one electronic signature retrieved for at least one of the two or more results from the database can be compared with the electronic signature for the candidate mark to confirm the candidate mark is genuine.

18 Claims, 15 Drawing Sheets

(56)                   References Cited

U.S. PATENT DOCUMENTS

| | | | |
|---|---|---|---|
| 10,061,958 B2 | 8/2018 | Voigt et al. | |
| 10,235,597 B2 | 3/2019 | Voigt et al. | |
| 11,064,149 B1 * | 7/2021 | Paun | H04N 21/8133 |
| 12,322,003 B2 * | 6/2025 | Rhoads | G09C 5/00 |
| 2006/0022059 A1 * | 2/2006 | Juds | G06K 19/06056 |
| | | | 235/494 |
| 2009/0138725 A1 * | 5/2009 | Madhvanath | G07C 9/37 |
| | | | 713/186 |
| 2012/0211555 A1 * | 8/2012 | Rowe | G06K 7/1404 |
| | | | 235/375 |
| 2014/0029809 A1 * | 1/2014 | Rhoads | G09C 5/00 |
| | | | 382/112 |
| 2015/0379321 A1 * | 12/2015 | Soborski | G07D 7/0054 |
| | | | 235/375 |
| 2016/0189015 A1 * | 6/2016 | Coulier | G06K 7/1417 |
| | | | 235/494 |
| 2017/0286735 A1 * | 10/2017 | Lazzouni | G06Q 30/018 |
| 2019/0087699 A1 * | 3/2019 | Arce | G06K 19/06056 |
| 2021/0279316 A1 * | 9/2021 | Eisen | G06F 21/32 |

OTHER PUBLICATIONS

International Preliminary Report on Patentability in International
Appln. No. PCT/US2023/019484, mailed on Oct. 31, 2024, 8 pages.

* cited by examiner

10A

—— Score Margin 1. Match
--- Score Margin 2. Match

10B

—— Score Margin 1. Match
--- Score Margin 2. Match

250A

250B

1100

1120

Memory

1110

Processor

1130

Storage Device

1150

1140

Input/Output

1160

Peripheral Devices

MARK AUTHENTICATION WITH DISTORTION TOLERANCE

CROSS-REFERENCE TO RELATED APPLICATION

This application is a National Stage Application under 35 U.S.C. § 371 of PCT International Application No. PCT/US2023/019484, filed Apr. 21, 2023, which claims the benefit of U.S. Provisional Pat. App. No. 63/333,516, filed Apr. 21, 2022, and each application is hereby incorporated by reference in its entirety.

TECHNICAL FIELD

The present disclosure is related generally to anti-counterfeiting technology and, more particularly, to methods and a computing device for determining whether a mark is genuine.

BACKGROUND

Counterfeit products are, unfortunately, widely available and often hard to spot. When counterfeiters produce fake goods, they often copy the labeling and bar codes in addition to the actual products. At a superficial level, the labels and bar codes may appear genuine and even yield valid data when scanned (e.g., decode to the appropriate Universal Product Code). While there are many technologies currently available to counter such copying, most of these solutions involve the insertion of various types of codes, patterns, microfibers, microdots, and other indicia to help thwart counterfeiting. Such techniques require manufacturers to use additional equipment and material and add a layer of cost and complexity to the production process.

SUMMARY

This specification describes technologies relating to authenticating a physical object, and more specifically to compensating for geometric distortions introduced when images of the physical object are captured by off-the-shelf cameras, such as cell phone cameras. There is no need to use a special lens to limit geometric appearance variations and/or to require a suitable method of illumination that minimizes the contrast of desired versus undesired image features in a consistent way. Rather, common cell phones can be employed, at locations of the user's choosing, to capture images of marks to be authenticated, and the authentication process can work across a wide variety of built-in cell phone imaging components with variable optics and with the various lighting conditions present in the environment.

The subject matter of these technologies can be implemented using the systems and techniques of one or more of U.S. Pat. Nos. 9,519,942, 9,940,572, 10,235,597, and/or 10,061,958, which are hereby incorporated by reference in their entireties. Particular implementations of the subject matter described in this specification can be implemented so as to realize one or more of the following advantages. The techniques can operate without knowledge of a physical object's geometric shape. The techniques can be used when significant image deviations are present, and for slightly curved surfaces without having to know the exact geometric surface shape. Thus, the techniques are suitable to tolerate curved surfaces with materials that are to some degree flexible (non-rigged). In addition, the techniques can be used to authenticate patterns with asymmetric directional feature distributions, such as bars where geometric distortions can be easily corrected in the direction orthogonal to the bars, but not so easily corrected in the direction of the bars due to the self-similarity in the direction of the bars.

Benefits and advantages of the described systems and techniques can further include: minimizing required information for identification, modeling and correction; minimizing long-tail error risk when applying corrections; simplifying user experience during setup and operation; and expanding the application domain with a minimal increase of computational complexity. Types of distortions that can be corrected and/or addressed include perspective distortions, correcting curvature from cylinder shaped objects with variable radius, or arbitrarily curved surfaces, distortions from sensor pose variations, and from lighting variations. The data series transformation technique can be applied to any marks, for example barcodes captured or visually presented with a tilt, diffused glare, and shadows, among other distortions. Data series transformation can be used to correct image distortions with fingerprint defects that cause fingerprint information loss. The data series transformation technique can be used to improve a hash identifier (HID) search, which relates to finding the correct reference fingerprint, and that reference fingerprint can be used to determine whether the mark is authentic. The data series transformation techniques can include shift correction, which can correct for several distortion types. In general, various search algorithms used during mark authentication can be improved using the data series transformation techniques of this specification, such as a bit shifting technique, to find an appropriate reference fingerprint and thereby improve the accuracy of mark authentication. The data series transformations can be agnostic to the type of distortion, e.g., by applying multiple corrective transforms, and therefore the techniques of this specification are effective across a variety of distortions without the need to identify the particular type of distortion.

In general, one or more aspects of the subject matter described in this specification can be embodied in one or more methods including: authenticating a candidate mark in an image using a distortion accommodation process that transforms a data series of an electronic signature for the candidate mark. Other embodiments of this aspect include corresponding systems, apparatus, and computer program products recorded on one or more computer storage devices, each configured to perform the actions of the methods. Thus, one or more aspects of the subject matter described in this specification can be embodied in one or more systems including a user interface, and one or more computers operable to interact with the user interface device and being programmed to perform the operations of the methods described herein, and one or more aspects of the subject matter described in this specification can be embodied in one or more non-transitory computer-readable mediums tangibly encoding a computer program operable to cause data processing apparatus to perform the operations of the methods described herein.

The foregoing and other embodiments can optionally include one or more of the following features, alone or in combination. The accommodation process can use multiple transformation functions, and each transformation function can approximate a particular distortion correction type. The data series can be a vector of numbers, and the numbers can be in a data type that includes at least one of bits, bytes, floats, doubles, hex numbers, or other data representations. A transformation function of the accommodation process can include at least one of shifting, warping, stretching, scaling, performing a geometric operation, or utilizing a lookup table of transformation values. A transformation function enabling approximate correction of targeted distortions to be removed from the data series can be selected. The transformation function can be parameterized and applied two or more times with two or more parameter values, enabling approximate correction of targeted distortions to be removed from the data series. The transformation function can be a shift, and a parameter of the parameterization can be the number of data series positions to shift. The transformation function can map data series elements from one value to another value within a same vector space. A fingerprint can be a data series member of the vector space. Authenticating can include: obtaining the electronic signature as the data series for the candidate mark, the electronic signature being generated from measured characteristics of the image of the candidate mark; transforming data series values of the electronic signature to generate two or more transformed data series versions of the electronic signature; deriving hash identifiers for the electronic signature and for the two or more transformed data series versions of the electronic signature; using the hash identifiers to retrieve a set of two or more results from a database of genuine mark signatures; and comparing at least one electronic signature retrieved for at least one of the two or more results from the database with the electronic signature for the candidate mark to confirm the candidate mark is genuine. The transforming can include performing a data series shift a number of spots in at least one direction, performed a particular number of times to create at least four transformed data series versions of the electronic signature. At least one of the two or more results can be one of the two or more results having a maximum matching score. The obtaining can include: receiving the image of the candidate mark; measuring the characteristics to produce a set of metrics for the characteristics; and generating the electronic signature based on the set of metrics.

Further, in general, one or more aspects of the subject matter described in this specification can be embodied in one or more methods including: obtaining an electronic signature as a data series for a candidate mark, the electronic signature being generated from measured characteristics of an image of the candidate mark; identifying at least one particular distortion type in the electronic signature; selecting a transformation function from a plurality of transformation functions based on the identified particular distortion type; transforming the data series utilizing the selected transformation function to generate at least one transformed data series; and utilizing the data series and the transformed data series to confirm the candidate mark is genuine. Other embodiments of this aspect include corresponding systems, apparatus, and computer program products recorded on one or more computer storage devices, each configured to perform the actions of the methods.

The details of one or more implementations of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
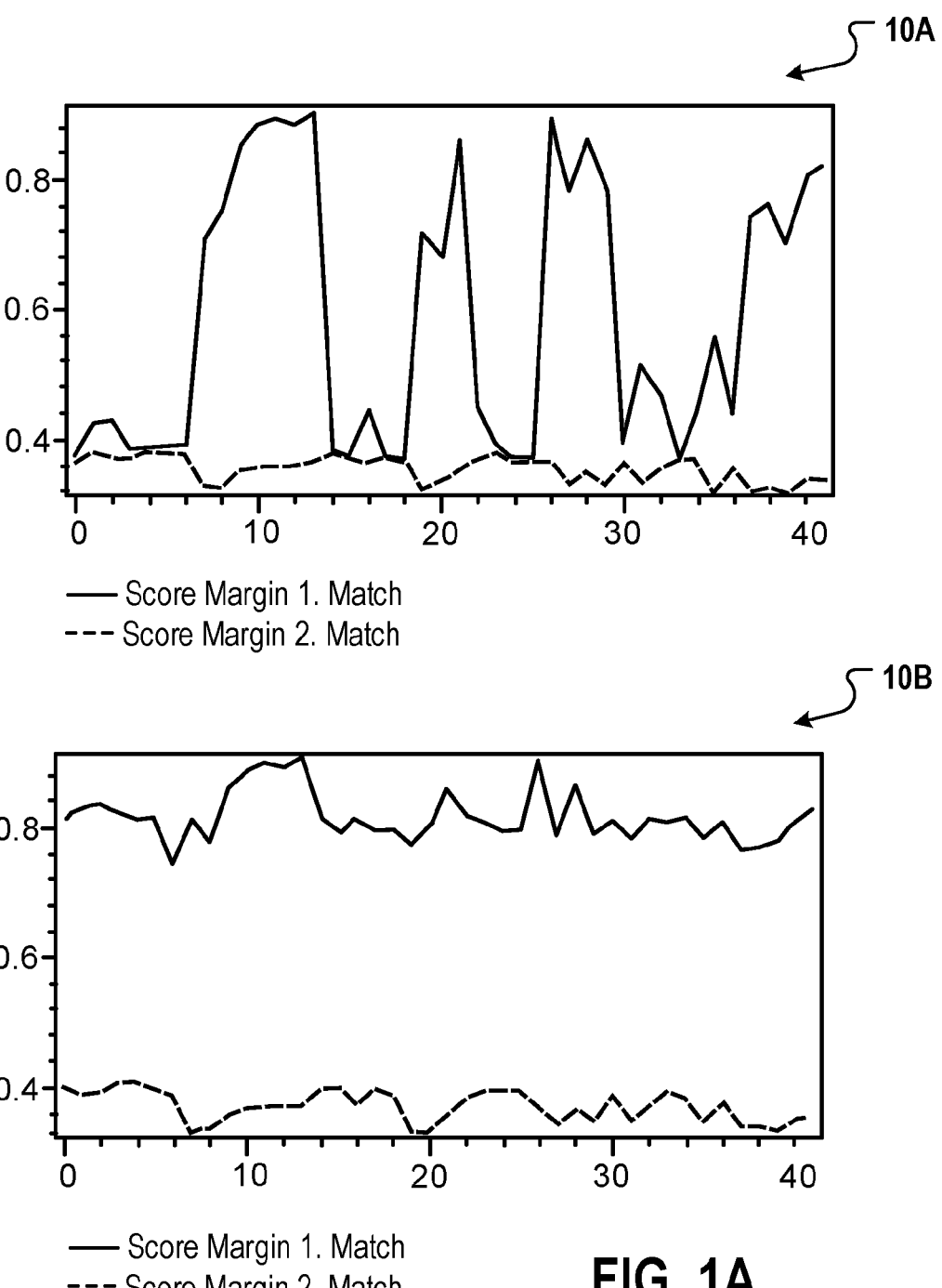
FIG. 1A shows fingerprint matching scores for a sequence of fingerprint pairs using different techniques.

Today's manufacturers can use automated mass production to produce millions of items that are practically indistinguishable to the human eye. However, to deter the creation and sale of counterfeit products, it is important to authenticate items to ensure that they are genuine, not counterfeit. The techniques of this specification create fingerprints for such items by capturing random surface print variations on an authentic version of the product or product packaging using image capture devices. More specifically, the techniques can identify print variations on marks or standard product codes (e.g., Universal Product Codes (UPC), Quick Response (QR) codes, and Data Matrix (DM) codes) that are already used to identify items or product types.

The authentication techniques can include: (1) capturing images during item production using an inline machine vision system, (2) computing reference fingerprints from those images, (3) storing the computed reference fingerprints in a database system for later access, (4) capturing images from a test item, e.g., using a cell phone in the field, (5) computing a second fingerprint, and (6) comparing the second fingerprint with the reference fingerprints stored in the database to establish whether a match exists. In addition, as described further below, the techniques can include creating transformed versions of the data series representing the captured images, and using the transformed versions to determine item authenticity. Applying transformations enables the system of this specification to determine item authenticity with increased accuracy.

As background, in an ideal authentication process, a reference fingerprint signature and a second verification fingerprint signature would match exactly when the signatures are derived from the same item, and they would not match when the signatures are derived from two different items. However, in practice, two fingerprints created from the same item do not match exactly for reasons that can include image noise, differences in the imaging sensors used for capturing and verification, and during verification, uncontrolled lighting conditions and pose variations that are introduced when a cell phone camera captures the image. Such variations can change item surface appearance and, in addition to other deviations from the image formation, propagate as signal noise components into the image and then into a fingerprint created for the image.

A fingerprint is then a mixture of the ideal fingerprint and various noise components. The additional noise can cause two fingerprints from the same item but derived using different image formation processes to differ, and the magnitude of the noise can increase with the magnitude of the deviations up to the point when a reference fingerprint and verification fingerprint do not match. To address such mismatches, the transformations of this specification can accommodate for distortion, and a system for item identification and authentication (a counterfeit detection system) becomes largely invariant (i.e., correctly authenticating only genuine marks, and rarely if ever failing to authenticate a genuine mark) with respect to the expected deviations created during authentication. In other words, a counterfeit detection system can be made more robust by the distortion accommodation techniques described in the specification, such that both false positives and false negatives for genuine mark detection are reduced. The distortion accommodation techniques can be applied at various stages throughout the authentication stages, whether applying a linear search on a full resolution fingerprint or a linear search on a reduced resolution fingerprint (e.g., in Hamming space), or in a tree search. The computation time is not appreciably increased in standard hardware (e.g., multi-core multi-threaded processing or other hardware or operating system optimization), as described further below. The limiting accuracy factor can be the number of fingerprints in the database and not the small additional computing resources required to process the additional candidates created by the distortion accommodation process.

In some implementations, a full resolution fingerprint can be used. A full resolution fingerprint includes more bit depth than a reduced resolution fingerprint. In such implementations, the distortion accommodation process can, for example, apply transformation (e.g., shift transformations) utilizing a multi-position transformation to the full resolution fingerprint, e.g., as described below in reference to FIG. 2B.

In addition, variations of the transformation can be applied to the full-resolution reference fingerprint to create a set of candidate fingerprints that are used to determine item authenticity. For example, a first variation of the transformation can be applied to the fingerprint to create a first transformed candidate, a second variation of the transformation can be applied to the fingerprint to create a second transformed candidate, and so on. The original fingerprint and the transformed candidates can be matched to stored fingerprints of authentic items to determine with increased accuracy whether the fingerprint represents an authentic item.

FIG. 1A shows fingerprint matching scores for a sequence of fingerprint pairs using different techniques. Each plot contains the scores of the correct matching item (top line) and the score of the next most similar incorrect matching item in the database (bottom line). When the correct matching item is sufficiently different from the next most similar incorrect matching item, authentic and inauthentic marks are strongly differentiated, and the accuracy of the authentication process is higher.

As background, Graph 10A shows matching scores for a sequence of fingerprint pairs in a system that is not invariant to deviation, and Graph 10B shows a system sufficiently invariant that the matching scores allow a reliable differentiation between the correct match (top line) and the highest incorrect matching score (bottom line) A higher matching score is associated with a better match. Graph 10A shows matching scores for a system that is sensitive to deviations, and the matching scores in the sequence (top line) drop down to a lower level where they cannot be differentiated from the best matches with other items (bottom line). Such a system can have low accuracy in item authentication. Graph 10B shows the same sequence of fingerprint matches, using the second system where the matching scores allow a reliable differentiation between the correct match and the highest score of an incorrect match. The second system is sufficiently invariant to the expected deviations, and therefore improves matching accuracy.

To produce results similar to Graph 10B, this specification describes techniques for creating fingerprint matching invariance considering the application domain of image-based item (or product) identification and/or authentication using the uncontrolled environment of a cell phone image capture (e.g., part placement variations from the hand motion holding the phone and holding the item, and a person's inability to correct for tilting of an item, a shallow depth of field resulting from high magnification and/or shorter working distance, image variations including image noise, glare, diffuse glare, perspective distortions, tilt, image defocus and partial blur, variations in image contrast, non-uniform image brightness, variable and limited resolution from different cell phone devices and variable optics, motion blur, optical aberrations, and variable cell phone camera post-processing functions for noise reduction and image enhancements). This specification describes multiple approaches to creating invariance to deviations, including matching multiple, transformed versions of a candidate mark against authentic marks.

In general, image formation variations that result in geometric distortions that propagate into the fingerprint can be effectively eliminated. Rather than correcting geometric distortions in image space, correction in image space can be avoided, which lets the deviations propagate into the fingerprint space, where they can be corrected with lower computational complexity using the systems and techniques described in this application. The correction in fingerprint space can be approximated with more generic lower-order models that allow correcting multiple types of distortions with the same method, with a lower parameter estimation complexity. Because of the reduced complexity of the parameter estimation problem, the described method(s) are more robust in scenarios where multiple deviations simultaneously present in the image, which can easily create estimation errors for conventional methods. Note that a more complex correction model, such as one that computes an inverse transformation using a normalization process, is not necessarily better because a more complex model can introduce more noise and errors because more parameters are estimated in the presence of image noise components, such as unexpected errors introduced when the inverse transformation is applied.

Moreover, in some implementations, fewer assumptions about the type(s) of deviation that are present are made, as compared with a conventional correction in image space. This means that the method(s) are more generic and require less prior knowledge of the image capturing system for effective operation, e.g., no need for careful selection of imaging components and/or controlling and limiting variables during part presentation (e.g., at a preferred normal orientation at an optimal working distance and aligned with the center of the optical axis) to the image capturing system. Perspective distortions can be corrected, for flat and slightly curved surfaces without additional knowledge of the surface curvature. The method(s) can be integrated into existing mark authentication systems without adding significant additional computation. In some cases, the computation complexity depends mostly on the number of reference fingerprints in the database and the additionally generated corrected candidates do not add to the computation complexity.

Figure 1B:
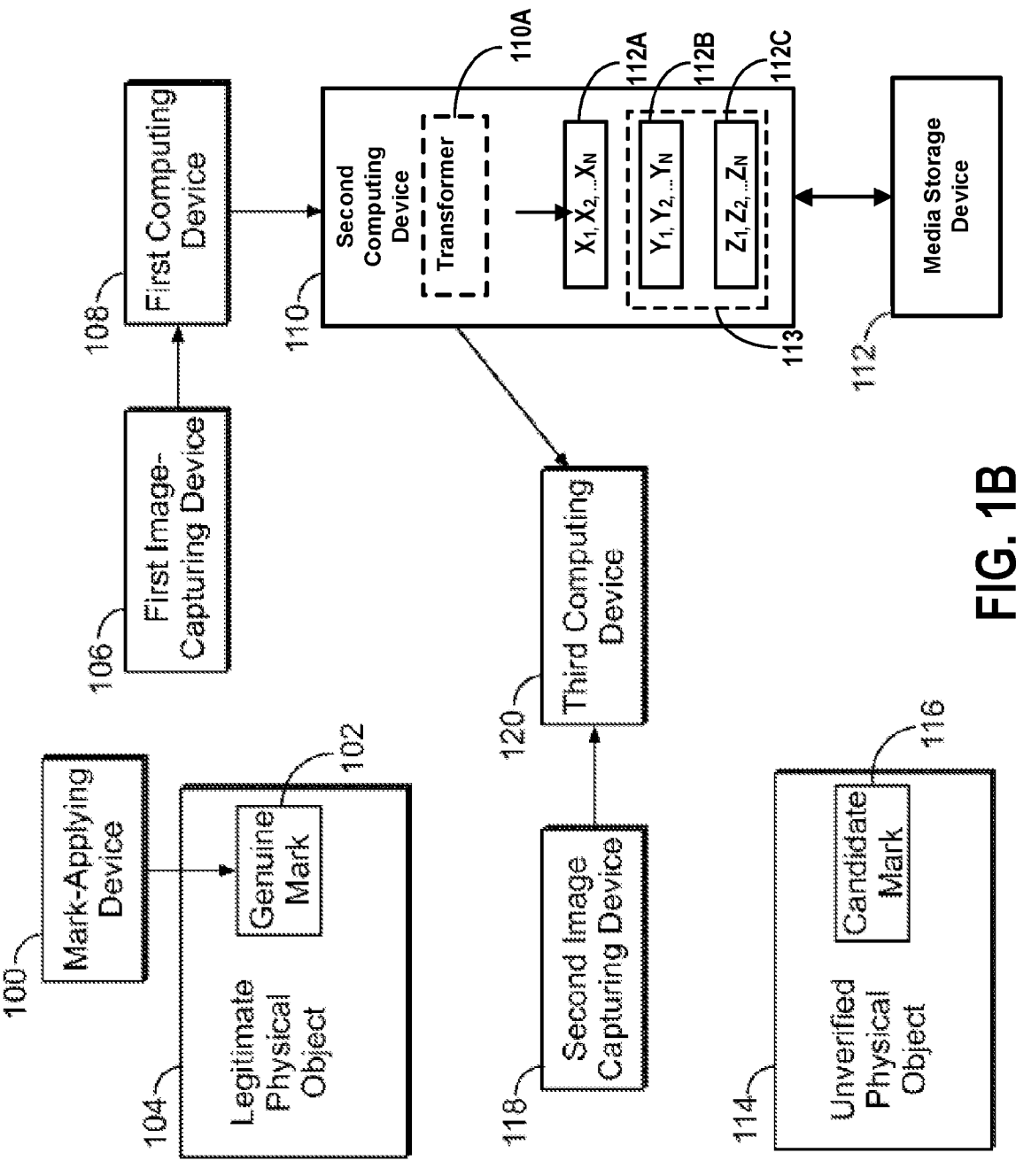
FIG. 1B shows an example system for mark authentication with distortion tolerance.

FIG. 1B shows an example system for mark authentication with distortion tolerance. The system can include a first computing device 108, a second computing device 110 and a third computing device 120, although fewer computing devices can be used. For example, the second computing device 110 can perform the functions of the first computing device 108, the third computing device 120, or both.

A mark-applying device 100 applies a genuine mark 102 ("mark 102") to a legitimate physical object 104 ("object 104"). In some implementations, the object 104 is an article of manufacture, such as a piece of clothing, handbag, or fashion accessory. In some implementations, the object 104 is a label, such as a barcode label or packaging for some other physical object. The mark 102 can be something that identifies a brand (e.g., a logo), something that bears information (e.g., a barcode), or a decoration. Possible implementations of the mark-applying device 100 include a printer (e.g., a laser or thermal printer), an etching device, an engraving device, a mold-applying device, a branding device, a stitching device, and a thermal-transfer device. The mark-applying device 100 applies the mark 102 by, for example, printing, etching, engraving, molding, branding, stitching, or thermally transferring the mark 102 onto the object 104. The mark 102 includes one or more artifacts. In some implementations, the mark 102 also includes intentionally-produced anti-counterfeiting features, such as microscopic patterns.

A first image-capturing device 106 (e.g., a camera, machine-vision device, scanner, etc.) captures an image of the mark 102 after the mark 102 is applied. The circumstances under which the first image-capturing device 106 captures the image of the mark 102 are controlled, such that there is reasonable assurance that the image is, in fact, that of a genuine mark 102. For example, the time interval between the mark-applying device 100 applying the mark 102 and the first image-capturing device 106 obtaining the image of the mark 102 can be small, and the first image-capturing device 106 can be physically located next to the mark-applying device 100 along a packaging line. Thus, when the term "genuine mark" is used, it refers to a mark that was applied by a mark-applying device at a legitimate source (i.e., not copied illegally or surreptitiously).

The first image-capturing device 106 transmits the captured image to a first computing device 108. Possible implementations of the first computing device 108 include a desktop computer, a rack-mounted server, a laptop computer, a tablet computer, and a mobile phone. (Mobile phones, tablet computers, portable virtual reality devices and similar portable devices can be collectively called mobile devices.) In some implementations, the first image-capturing device 106 is integrated with the first computing device 108, in which case, the first image-capturing device 106 transmits the captured image to logic circuitry of the first computing device 108. The first computing device 108 or logic circuitry therein receives the captured image and transmits the captured image to a second computing device 110. Possible implementations of the second computing device 110 include all of those devices listed for the first computing device 108.

The second computing device 110 receives the captured image and uses the captured image to measure various characteristics of the mark 102, resulting in a set of metrics that include data regarding artifacts of the mark 102. As will be described further, the set of metrics can be one of several sets of metrics that the second computing device 110 generates about the mark 102. The second computing device 110 can carry out the measurements in different locations on the mark 102. In doing so, the second computing device 110 can divide the mark 102 into multiple subareas (e.g., in accordance with an industry standard). In some implementations, if the mark 102 is a two-dimensional (2D) barcode, the second computing device 110 carries out measurements on all of or a subset of the total number of subareas (e.g., all of or a subset of the total number of cells) of the mark 102. Examples of characteristics of the mark 102 that the second computing device 110 can measure include: (a) feature shape, (b) feature aspect ratios, (c) feature locations, (d) feature size, (e) feature contrast, (f) edge linearity, (g) region discontinuities, (h) extraneous marks, (i) printing defects, (j) color (e.g., lightness, hue, or both), (k) pigmentation, and (l) contrast variations. In some implementations, the second computing device 110 takes measurements on the same locations from mark to mark for each characteristic, but on different locations for different characteristics. For example, the first second computing device 110 can measure the average pigmentation on a first set of locations of a mark, and on that same first set of locations for subsequent marks, but measure edge linearity on a second set of locations on the mark and on subsequent marks. The two sets of locations (for the different characteristics) can be said to be "different" if there is at least one location that is not common to both sets.

In some implementations, the results of characteristic measuring by the second computing device 110 include a set of metrics. There can be one or more sets of metrics for each of the measured characteristics. The second computing device 110 analyzes the set of metrics and, based on the analysis, generates a data series that represents a signature of the mark 102 and that is based on the set of metrics. The data series can be any series of characters. For example, each data series can be a vector of numbers represented by bits, bytes, floats, doubles, hex numbers, or other data representations. Because the set of metrics includes data regarding an artifact (or multiple artifacts) of the mark 102, the signature will be indirectly based on the artifact. If the mark 102 carries data (as in the case of a 2D barcode), the second computing device 110 can also include such data as part of the signature. Put another way, in some implementations, the signature can be based on both artifacts of the mark 102 and on the data carried by the mark 102.

In some implementations, to generate the signature, for each measured characteristic of the mark 102, the second computing device 110 ranks the metrics associated with the characteristic by magnitude and uses only those metrics that reach a predetermined threshold as part of the signature. For example, the second computing device 110 can refrain from ranking those metrics that are below the predetermined threshold. In some implementations, there can be a different predetermined threshold for each characteristic being measured. One or more of the predetermined thresholds can be based on a noise threshold and on the resolution of the first image-capturing device 106.

For example, the second computing device 110 can obtain one hundred data points for each characteristic and collect six groups of measurements: one set of measurements for pigmentation, one set of measurements for deviation from a best-fit grid, one set of measurements for extraneous markings or voids, and three separate sets of measurements for edge linearity.

As part of the ranking process, the second computing device 110 can group together metrics that are below the predetermined threshold regardless of their respective locations (i.e., regardless of their locations on the mark 102). Also, the second computing device 110 can order the metrics (e.g., by magnitude) in each characteristic category as part of the ranking process. Similarly, the second computing device 110 can simply discount the metrics that are below the predetermined threshold. Also, the process of ranking can simply constitute separating metrics that are above the threshold from those that are below the threshold.

In some implementations, the second computing device 110 orders the measured characteristics according to how sensitive the characteristics are to image resolution issues. For example, if the first image-capturing device 106 does not have the capability to capture an image in high resolution, it can be difficult for the second computing device 110 to identify non-linearities of edges. However, in some cases, the second computing device 110 will have no difficulty identifying deviations in pigmentation. Thus, the second computing device 110 can, on this basis, prioritize pigmentation over edge non-linearities. In some implementations, the second computing device 110 orders the measured characteristics in reverse order of resolution-dependence as follows: subarea pigmentation, subarea position bias, locations of voids or extraneous markings, and edge non-linearities.

In some implementations, the second computing device 110 weights the measured characteristics of the mark 102 based on one or more of the resolution of the first image-capturing device 106 and the resolution of the captured image of the mark 102. For example, if the resolution of the first image-capturing device 106 is low, then the second computing device 110 can give more weight to the average pigmentation of the various subareas of the mark 102. If the resolution of first image-capturing device 106 is high, then the second computing device 110 can give measurements of the edge irregularities of various subareas higher weight than other characteristics.

If the mark 102 includes error-correcting information, such as that set forth by ISO/IEC 16022, then the second computing device 110 can use the error-correcting information to weight the measured characteristics. For example, the second computing device 110 can read the error-correcting information, use the error-correcting information to determine which subareas of the mark 102 have errors, and under-weight the measured characteristics of such subareas.

In some implementations, in generating the signature, the second computing device 110 weights the measurements for one or more of the characteristics of the mark 102 based on the mark-applying device 100. For example, if the mark-applying device 100 is a thermal transfer printer, it is known that, for those marks applied by the mark-applying device 100, edge projections parallel to the substrate material direction of motion are unlikely to yield edge linearity measurements of a magnitude sufficient to reach the minimum threshold for the edge linearity characteristic. The second computing device 110 can, based on this known idiosyncrasy of the mark-applying device 100, under-weight the edge linearity characteristic measurements for the mark 102.

Figure 2A:
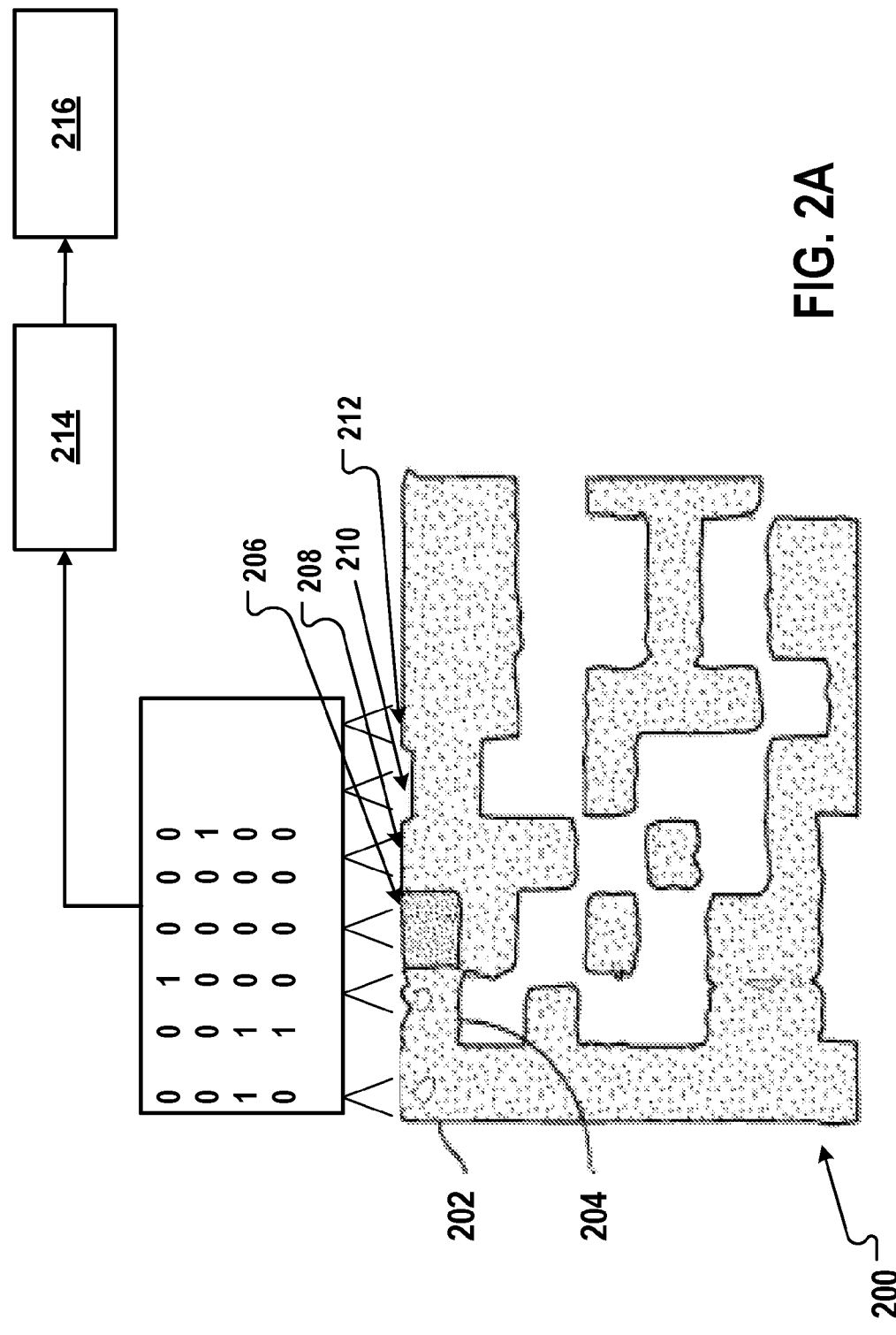
FIG. 2A shows an example of how a computing device can generate an electronic signature for a mark.

FIG. 2A shows an example of how a computing device can generate an electronic signature for a mark. In some implementations, a computing device generates an electronic signature for a mark by encoding the signature as a string of bytes, which can be represented as American Standard Code for Information Interchange ("ASCII") characters, rather than as numeric magnitude data. This alternative format allows the computing device to use the signature data directly as an index for looking up the mark in a media storage device. Rather than storing the location and magnitude of each signature metric for the genuine mark, the computing device can store the presence (or absence) of significant signature features and each of the evaluated locations within the genuine mark. For example, in the case of a 2D Data Matrix symbol that does not carry or encode a unique identifier or serial number, the computing device can store the signature data of the mark as a string of characters, each encoding the presence or absence of a feature exceeding the minimum magnitude threshold for each characteristic in a subarea, but not encoding further data about the magnitude or number of features in any one characteristic. In this example, each subarea in the mark 200 of FIG. 2A has four bits of data, one bit for each of set of metrics, where a '1' indicates that the particular metric has a significant feature at that subarea. For example, 0000 (hexadecimal 0) can mean that none of the four tested characteristics are present to a degree greater than the threshold magnitude in that particular subarea. A value of 1111 (hexadecimal F) would mean that all four of the tested characteristics are present to a degree greater than the minimum in that particular subarea.

In the example of the mark 200, the first six subareas are coded as follows. (1) A first subarea 202 has no artifact for average luminance: it is satisfactorily black. It has no grid bias. It does have a large white void. It has no edge shape artifact: its edges are straight and even. The computing device thus codes it as 0010. (2) A second subarea 204 has a void and an edge shape artifact. The computing device thus codes it as 0011. (3) A third subarea 206 is noticeably gray rather than black, but has no other artifacts. The computing device thus codes it as 1000. (4) A fourth subarea 208 has no artifacts. The computing device thus codes it as 0000. (5) A fifth subarea 210 has a grid bias but no other artifacts. The computing device thus codes it as 0100. (6) A sixth module 212 has no artifacts. The computing device thus codes it as 0000. Thus, the first six modules are coded, for example, as binary 001000111000000001000000, hexadecimal 238040, decimal 35-128-64 or the ASCII characters #€ @. Using a 2D Data Matrix code as an example, with a typical symbol size of 22×22 subareas, the ASCII string portion containing the unique signature data would be 242 characters in length, assuming the data is packed two modules per character (byte). The computing device can store the signature strings of genuine marks in a database, flat file, text document or any other construct appropriate for storing populations of distinct character strings. In some implementations, the signature can be processed by a signature transformer 214 that can generate multiple transformed signatures and/or a HID generator 216, described below. In some implementations, HIDs are generated first, and transformations are performed on the HIDs. Note that performing multiple comparisons, as described further below, results in increased matching accuracy, but incurs no performance loss as execution time is dominated by memory transfers, e.g., persistent storage to random access memory (RAM), and not the computation required for matching.

Returning to FIG. 1B, the second computing device 110 uses location identifiers corresponding to a subset of the metrics of the signature to derive a HID. In some implementations, the second computing device 110 uses index numbers corresponding to a subset of the highest-magnitude metrics of a signature to derive a HID. The second computing device 110 can, in deriving the HID, use index numbers corresponding to a subset of each set of metrics as a block within an overall HID. The second computing device 110 stores the signature and the HID (e.g., using a database program) in a media storage device 112 (e.g., a redundant array of independent disks) such that the HID is associated with the signature. In some implementations, the HID can also be used to look up the signature (e.g., the second computing device 110 uses a database program to set the HID as an index key for the signature). In some implementations, the media storage device 112 is made up of multiple devices that are geographically and temporally distributed, as is often the case with cloud storage services. In some implementations, one or more of the characteristic measuring, analysis of the various sets of metrics, generation of the signature, derivation of the HID, and storage of the signature and the HID are carried out by the first computing device 108. In some implementations, all of those steps are carried out by the first computing device 108 and the media storage device 112 is directly accessed by the first computing device 108. In some implementations, the second computing device 110 is not used. In some implementations, the second computing device 110 transmits the signature and HID to a separate database server (i.e., another computing device), which stores the signature and HID in the media storage device 112.

Continuing with FIG. 1B, an unverified physical object 114 ("unverified object 114"), which may or may not be the legitimate physical object 104, needs to be tested to ensure that it is not counterfeit or otherwise illegitimate. Possible implementations of the unverified object 114 are the same as those of the legitimate physical object 104. On the unverified object 114 is a candidate mark 116. Possible implementations of the candidate mark 116 are the same as those of the genuine mark 102. A second image-capturing device 118 (e.g., a camera, machine-vision device, scanner, etc.) captures an image of the candidate mark 116 and transmits the image to a third computing device 120. Note that an image can be (but need not be) a picture captured with a traditional camera (e.g., the second image-capturing device 118), and an image can further include visual data from a video recording; visual data from a portion of an augmented reality or virtual reality environment; and other sources of image data.

As with the first image-capturing device 106 and the first computing device 108, the second image-capturing device 118 can be part of the third computing device 120, and the transmission of the captured image of the candidate mark 116 can be internal (i.e., from the second image-capturing device 118 to logic circuitry of the third computing device 120).

The third computing device 120 (or logic circuitry therein) receives the captured image and transmits the captured image to the second computing device 110. The second computing device 110 uses the captured image to measure various characteristics of the candidate mark 116, including the same characteristics that the second computing device 110 measured on the genuine mark 102. The result of this measurement is a set of metrics for the characteristic. Over successive measurements, the result can include one or more sets of metrics for each of the measured characteristics. The second computing device 110 then generates a signature that is based on the set (or sets) of metrics, and does so using the same technique it used to generate a signature for the genuine mark 102. If the candidate mark 116 is, in fact, the genuine mark 102 (or generated by the same process as the genuine mark 102), then the signature that the second computing device 110 creates will, like the signature generated from the captured image of the genuine mark 102, be based on the artifacts of the genuine mark 102. If, on the other hand, the candidate mark 116 is not the genuine mark 102 (e.g., is a counterfeit), then the signature generated by this latest image will be based on whatever other characteristics the candidate mark 116 exhibits-artifacts of the counterfeiting process, an absence of artifacts from the mark-applying device 100, etc. The second computing device 110 uses location identifiers corresponding to a subset of the metrics of the signature of the candidate mark 116 (e.g., index numbers of a subset of the highest-magnitude metrics) to derive a HID for the candidate mark 116.

In addition, the second computing device 110 can include a transformer 110A that applies transformation functions to transform data series values of the signature to generate transformed data series versions 112A, 112B, 112C of the electronic signature, which can be called transformed signatures (collectively "transformed signatures 112"). The second computing device 110 can use various data series transformation techniques to generate the transformed signatures 112. Examples of transformations can include shifting, warping, stretching, scaling, performing a geometric operation, or utilizing a lookup table of transformation values. The transformation function can map data series elements from one value to another value within a same vector space 113, and the fingerprint can be a data series member of the vector space 113.

In some implementations, it is presumed that some type of distortion (even if unidentified) may be present, and so at least one transform is applied by transformer 110A for every candidate mark 116, thus avoiding any need to detect whether or not any distortion is actually present. In some implementations, one or more types of transforms (e.g., a shift operation) are applied in multiple directions with multiple offsets. By applying multiple variations of correction and then using the one that works best (i.e., that maximizes the fingerprint similarity score) various image distortions can be accounted for in the mark authentication process without actually identifying an exact distortion type. As a result of the transformer 110A always applying multiple corrective transforms, the system can behave in an agnostic way without needing to parameterize precisely the distortion upon which it is operating. This can be understood as a "blind" correction that is effective across a variety of distortions without the need to identify the type of distortion present in the image.

Nonetheless, in some implementations, the transformation function can be selected based on detected distortions of the image. For example, if the distortion is a tilt, a bit-shift transformation can be applied. Thus, in some implementations, the transformation function enables approximate correction of targeted distortions to be removed from the data series. In some implementations, the transformation function is parameterized and applied two or more times with two or more parameter values, enabling approximate correction of targeted distortions to be removed from the data series. For example, by applying a transformation function once or multiple times, the values in the data series that have been distorted are corrected (or approximately corrected), thereby entirely or largely removing the distortion from the data series.

The second computing device 110 can generate a predefined and/or configurable number of transformed signatures 112, such as 2, 3, 5, 10 and so on from the signature of the candidate mark 116. As described further below, the second computing device 110 can use the signature of the candidate mark 116 and the transformed signatures 112 to authenticate the mark, which improves authentication accuracy. The second computing device 110 derives HIDs for the transformed signatures 112 using the same techniques used to derive a HID for the signature of the candidate mark 116.

In general, at least some (and potentially all) of the noise component from the image formation is allowed to propagate into the image and then into the space of the fingerprint signature. During the fingerprint extraction, geometric alignment deviation in the orthogonal direction of bars are mostly removed because the signature feature areas can be correctly aligned along the edges of the bars. However, geometric deviations in the other directions remain present. By propagating the geometric distortion function from the image space into the fingerprint-signature space, application of the transformation in fingerprint space is found to be less complex from a computational perspective, while still achieving similar or even better results. Perspective distortions for curved surfaces and flat surfaces can be approximated with a simpler lower-order one-dimensional function in fingerprint signature space. Without estimating model parameters, the parameter space can be sampled and a small population of transformed fingerprint signatures can be created, of which at least one will be close to the undistorted ideal fingerprint signature.

Figure 2B:
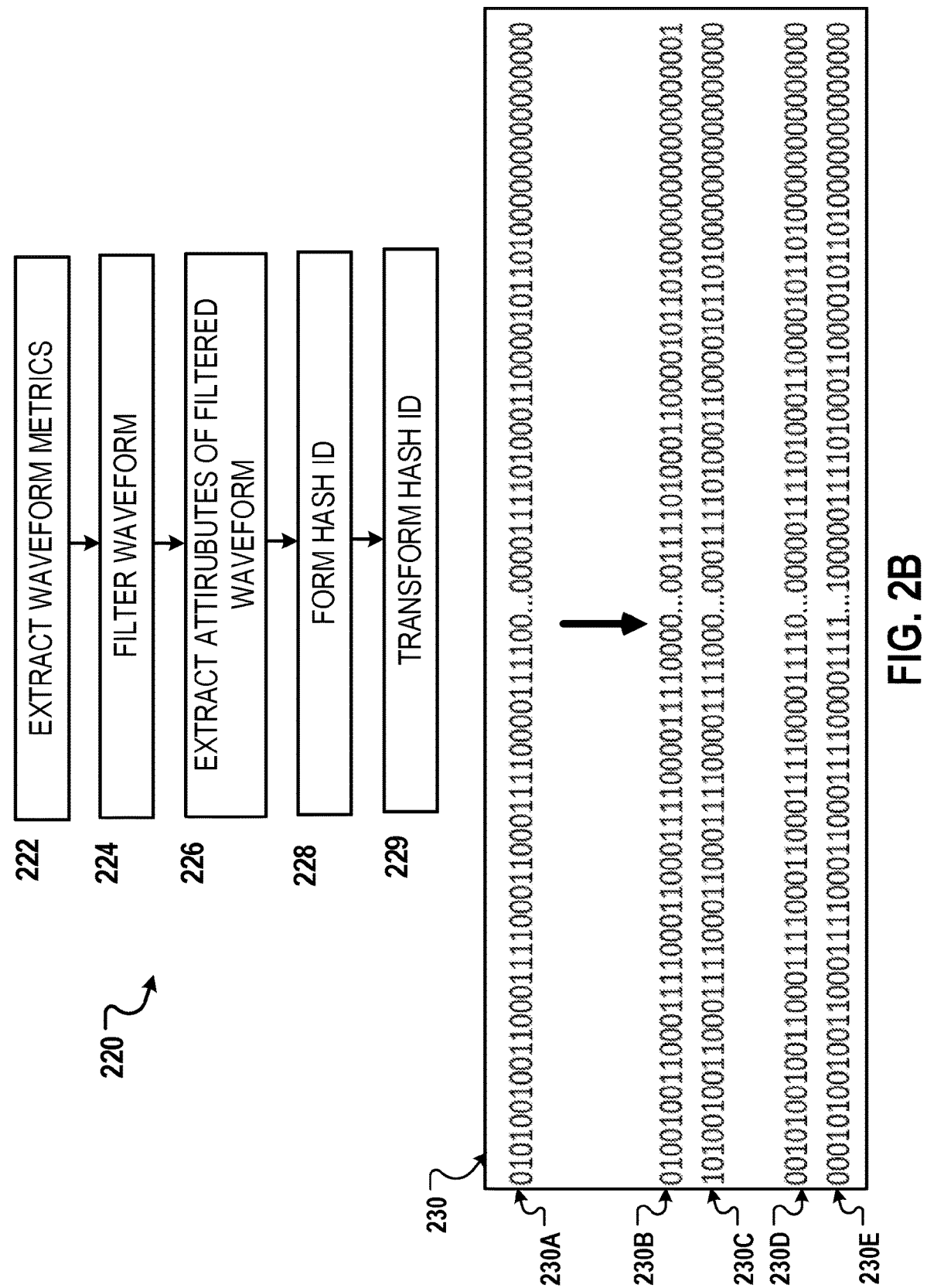
FIG. 2B shows a flow diagram for bit shift transformation and an example of a bit shift transformation.

FIG. 2B shows a flow diagram for bit shift transformation and an example of a bit shift transformation. A bit shift transformation is an example of a function that can be used to create transformed signatures. The original sequence 230a is shown at the top of the list 230 of bit signatures, and a series of four transformations 230B, 230C, 230D, 230E are shown below. The topmost transformed signature 230B is generated by shifting each bit from the original sequence 230A two places to the left. For example, the third position in the original sequence 230A becomes the first position in the transformed sequence 230B, the fourth position in the original sequence 230A becomes the second position in the transformed sequence 230B, and so on. The bits at the beginning of the original sequence 230A are appended to the end of the transformed sequence 230B. For example, since the transformed sequence 230B is created by shifting two places, the first bit on the original sequence 230A becomes the second to last bit in the transformed sequence 230B. The second transformed sequence 230C is created by shifting bits one place to the left; the third transformed sequence 230D is created by shifting bits one place to the right; and the fourth transformed sequence 230E is created by shifting bits two places to the right. The number of bits in the data series to shift (e.g., 1 bit left, 2 bits left, 1 bit right, etc.) can be configured or be parameterized. As noted above, any number of transformed sequences can be created, and techniques other than bit shifting can be used, and other shifting techniques can also be used. For example, in a right shift, instead of prepending bits from the end of the series to the beginning of the series a predefined set of bits (e.g., all zeros) can be prepended.

The data transformed by a bit shift transformation can be generated using the techniques described in U.S. Pat. No. 9,940,572 and shown in flow diagram 220, which is particularly effective with respect to "high variability" print technologies (e.g., thermal transfer or inkjet) where outlier artifacts of sufficiently discernable magnitude are readily available to act as repeatable HID locations. However, other print technologies may not exhibit the same type of overt variations.

In some implementations, the computing device filters the waveform, resulting in a filtered waveform. Examples of possible filters include a smoothing process such as a moving average, a time-domain convolution, a Fourier series operation, a spatial bandpass filter, and a low pass filter. In some implementations, to calculate the moving average, the computing device takes two or more data points from the set of metrics, adds them together, divides their sum by the total number of data points added, replaces the first data point with the average, and repeats this process with each successive data point until the end of the set of metrics is reached.

In the flow diagram 220, the computing device can extract (222) a waveform from the metrics. For example, the computing device can analyze the metrics as a set of ordered pairs (metric versus identifier (e.g., index value) of location in the mark where metric was obtained) and analyze those ordered pairs as a waveform.

The computing device can filter (224) the waveform in a way that allows information "spread." For example, applying a spatial filter before the window average allows the data within each window to include some of the information contained in the neighboring windows. In other words, the computing device incorporates information from adjacent window(s) within the averaged data points in a particular window.

The computing device can extract (226) attributes of the filtered waveform, such as the position of zero crossings, peak-to-peak distances, integration or differentiation of the data, etc. Any or all of these techniques can be used as the basis for constructing an HID. In some implementations, the computing device divides the filtered waveform into sections or 'bands,' and calculates the local average of the waveform in each band. In some implementations, the computing device extracts attributes of the unfiltered waveforms (i.e., does not carry out the filtering process).

The computing device can form (228) a hash identifier from the extracted attributes (of the one or more filtered waveforms). The computing device can normalize the band averages and compose a binary representation of the data. The binary string represents the local average as being above or below the overall mean of the band averages. This binary string now becomes the HID block for this particular metric. The computing device composes the remainder of the HID blocks similarly for each remaining metric. Once the hash identifier has been determined, it can be transformed (229), e.g., using a bit shift transformation, as described above.

In some implementations, when using this technique, the computing device evaluates the stored HID of the genuine mark against the HID of an incoming mark in a manner different from that described above. For example, instead of fuzzy logic searching, the computing device can use Boolean operations for computing the HID match score. In some implementations, the computing device applies a bitwise inverted exclusive OR against the original and incoming candidate bit patterns. As an example, if the original HID block is 110101011, the computing device can evaluate an incoming candidate as follows:

|   |   |   |   |   |   |   |   |   |   |
|---|---|---|---|---|---|---|---|---|---|
| 1 | 1 | 0 | 1 | 0 | 1 | 0 | 1 | 1 | Genuine (Block 1) |
| 1 | 1 | 0 | 0 | 0 | 1 | 1 | 0 | 1 | Candidate (Block 2) |
| 1 | 1 | 1 | 0 | 1 | 1 | 0 | 0 | 1 | NOT(XOR) Result |

The "agreeing" bits, represented by the Boolean TRUE result (1) are then summed by the computing device (e.g., to compute a Hamming distance). This sum becomes the HID score for that block. The computing device carries out this process for all blocks in all original HID records against the HID of the candidate mark. Once this is complete, the computing device evaluates the resulting culled list of original electronic signatures against the full candidate (e.g., cell phone submitted) electronic signature as previously described. If any of the electronic signatures from the culled list yield a result of "genuine" for the candidate electronic signature data, then the computing device reports the verification result as such. If none of the culled list yields a "genuine" result, then the computing device reports (e.g., to the user via a user interface-locally or by transmitting a message to the remote device (e.g., cell phone)) the verification result as "counterfeit."

In some implementations, instead of representing each band of a waveform as a binary value, the computing device can retain some of the amplitude information during filtering. The computing device can, for example, use the actual band average values to compose the HID. Then, rather than using Hamming distance as the similarity measure (to determine whether the HIDs closely match), the computing device uses covariance or numerical correlation to assess the match score of incoming candidate HIDs. By varying the width and number of the averaging windows, the computing device can raise or lower the HID resolution as needed, with more and/or narrower windows yielding an HID of higher discriminative power (but also being larger and requiring more memory to store), and wider and/or fewer windows having lower storage needs (due to the greater reduction of data) but with proportionally lower discriminative power.

To illustrate the reduction in data (and, consequently the increased search speed and reduced storage requirements) by using one or more of the techniques discussed, for example, the raw waveform can have 700 data points. Each is a floating point number of 32 bits which is over 22 kB. In the Hamming/binary example, the computing device would reduce the data down to 9 bits. This represents a dimensional reduction from 700 32-bit data points to nine 1-bit data points. When the computing device keeps the amplitude information (actual band average value), the dimensional reduction would be to 32×9=288 bytes. Thus, the dimensional reduction in that example would be from 700 32-bit points to nine 32-bit points.

In some implementations, the computing device employs a procedure for selecting or preferentially weighting metrics extracted from certain regions of the mark over metrics from non-preferred regions of the mark. This accounts for the fact that, in a low-variability scenario, some regions of a mark will carry more usable signature features for constructing a reliable HID than other areas. This weighting can be done in a variety of ways, including time domain signal amplitude analysis, frequency domain energy analysis, and other methods. In short, the computing device uses different sets of rules for weighting the metrics depending on, for example, whether the region being analyzed exhibits high energy or not.

In some implementations, the computing device uses a measure of the total signal energy as derived from a Fourier power series of the metrics data to establish a 'weighting score' for each available signature feature metrics data set. The computing device calculates the total signal energy by summing the individual spectral energies across the power series, where the energy of each spectral component is calculated as the square root of the sum of the squares of the real and imaginary parts of the frequency domain number.

In some implementations, to calculate a weighting score, the computing device sums the amplitudes of each band in the particular power series it is analyzing. Once the computing device has a weighting score for each metrics data set, it can sort them by scores in descending order and select the highest scoring (highest signal energy) metrics data sets for use in construction of the HID for that mark.

In some implementations, the computing device uses the techniques described above when operating on UPC linear barcodes. In this case, 52 HID blocks are available, there being two per "bar" in the symbol (one metric data series extracted from the leading edge of each bar and one from the trailing edge, excluding the left and right guard bars). The computing device can, for example, choose to use the metrics with the top five highest 'signature energies' to perform the HID block operations.

In some implementations, when creating the HID key for an original UPC barcode the computing device stores all 52 signature metrics data sets along with the HID derived from it. Assuming an HID block length of 10 bits, the computing device will end up with an HID with a total length of 520 bits.

For efficient processing, the computing device can employ a weighting scheme compatible with the bitwise operations used in the HID comparison method described above. In some implementations, the computing device constructs a mask that has Boolean TRUE values at the bit locations corresponding to HID blocks of high/preferred weighting, and Boolean FALSE at all other bit locations. At this point, a simple bitwise AND operation with the mask is all that is needed to calculate an HID similarity measure between two HIDs using only the blocks with the highest energy signal (and therefore the best discriminative power).

As a simplified example, in a case where the computing device has constructed HIDs of 8 blocks, each can have 10 bits per block, yielding 80 bit HIDs. Further, the computing device will be, in this example, using only the top 5 highest energy HID blocks for comparing an HID (A) of the signature of an original (genuine) mark to an HID (B) of a candidate mark.

Figure 2C:
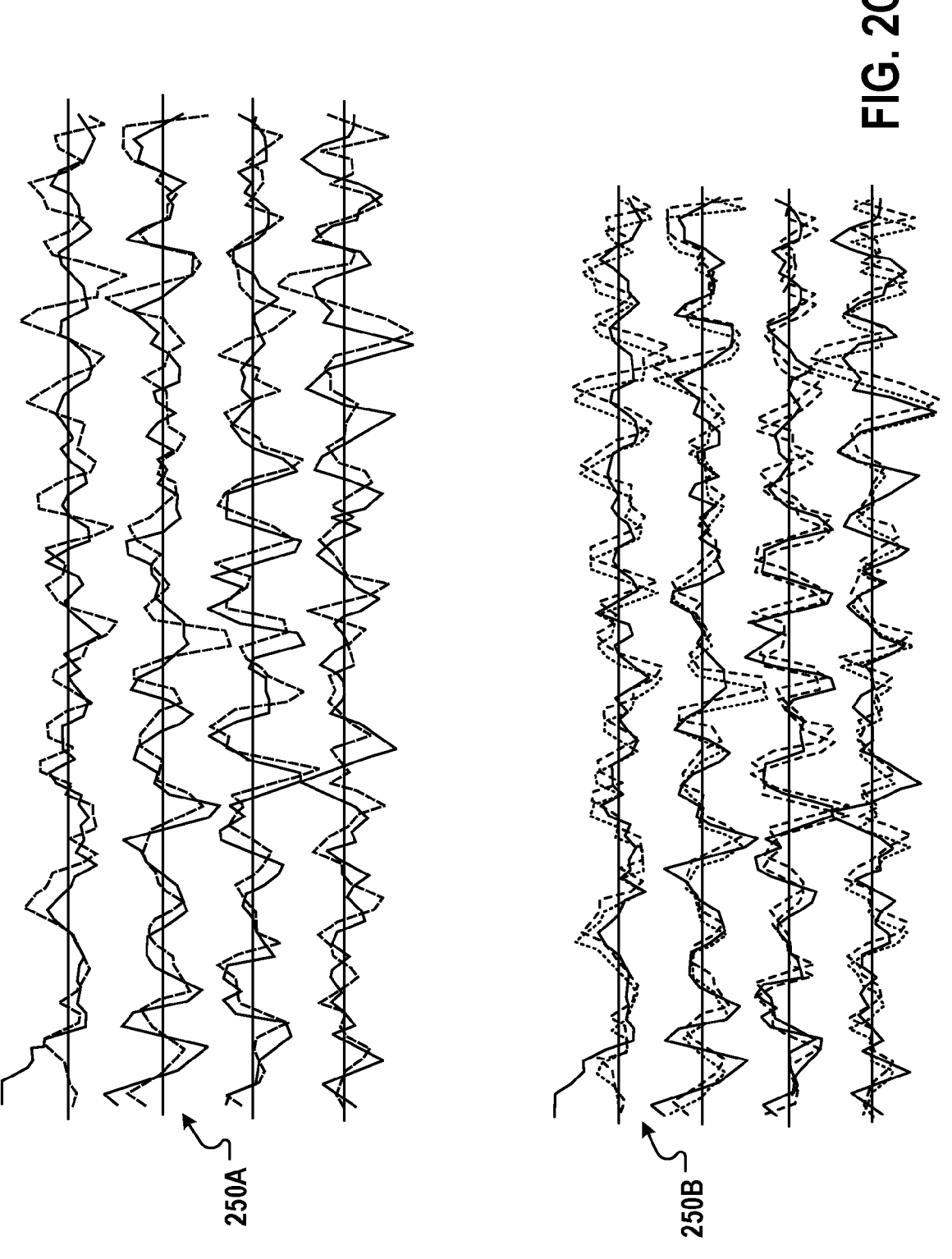
FIG. 2C shows examples of comparisons between the signatures of two images of authentic marks.

FIG. 2C shows examples of comparisons between the signatures of two images of authentic marks. The first example 250A shows, for 4 images, the offset between the waveforms representing images of a mark taken by different imaging devices. The solid lines represent the waveforms from training (during which each image is taken in a controlled environment) and the dashed lines represent the waveforms from testing (during which each image is taken in an uncontrolled environment). Note that the waveforms are generally offset laterally due to perspective distortion in each image. In light of this, a bit shift correction (e.g., as illustrated in FIG. 2B) can be an effective correction. When such shifting techniques are used to correct for the perspective distortions, e.g., in the second set of examples 250B, the waveforms become better aligned. The dotted lines represent the waveforms after the dashed line waveforms are shifted. The elimination of the out-of-phase effect caused by a keystone distortion permits the calculations of the 'true' similarity between the fingerprint data, effectively correcting the image distortion in the fingerprint data domain, and enabling more accurate determination of mark accuracy. This same principle can be exploited in the search algorithms, where the similarity measures are performed on reduced-resolution representations of this same fingerprint data. For HID search, the data bit depth can be reduced to 1, and a hamming comparison can be performed.

Returning to FIG. 1B, the second computing device 110 compares (e.g., through querying a database) the HID of the candidate mark 116 and the HID(s) of the transformed signatures with HIDs of genuine marks stored in the media storage device 112. As an outcome of the comparison, the second computing device 110 either receives no closely-matching results (e.g., no results that pass the predetermined threshold), or receives one or more closely-matching HIDs from the media storage device 114. If the second computing device 110 receives no closely-matching results, then the second computing device 110 can indicate (e.g., by transmitting a message) to the third computing device 120 indicating that the candidate mark 116 cannot be verified (e.g., transmits a message indicating that the candidate mark 116 is not genuine). The third computing device 120 receives the message and can indicate, e.g., on a user interface or by recording a message in a log file, that the candidate mark 116 cannot be verified (or that the candidate mark 116 is counterfeit). In some implementations, the third computing device 118 carries out one or more of the measuring, generating, and deriving steps, and transmits the signature (or HID, if the third computing device 118 derives the HID) to the second computing device 110.

If, on the other hand, the second computing device 110 finds one or more HIDs that closely-match the HID of the candidate mark 116 or the HID of a transformed signature, then the second computing device 110 will respond by retrieving, from the media storage device 112, the signatures that are associated with the closely-matching HIDs. The second computing device can retrieve, for example, a predefined and/or configurable number of results (e.g., the most closely matching 100 results, 500 results, 1000 results, and so on), all results that meet matching criteria (e.g., are 70% matched, 80% matched, 90% matched, etc.), or up to a predefined and/or configurable number of results (e.g., the closest matching results that are 90% matched, not to exceed 100 results). The second computing device 110 then compares the actual signatures that it generated for the candidate mark 116 and the transformed signatures with the retrieved genuine signatures. The second computing device 110 repeats this process for each signature to which a closely-matching HID is associated. If the second computing device 110 is not able to closely-match the signature of the candidate mark 116 or any of the transformed signatures with any of the retrieved signatures, then the second computing device 110 can indicate (e.g., by transmitting a message) to the third computing device 120 indicating that the candidate mark 116 cannot be verified. The third computing device 120 receives the message and can indicate, e.g., on a user interface, that the candidate mark 116 cannot be verified. If, on the other hand, the second computing device 110 is able to closely-match the signature of the candidate mark 116 or a transformed signature with a retrieved signature, then the second computing device 110 indicates (e.g., by transmitting a message) to the third computing device 120 that the candidate mark 116 is genuine.

Figure 3A:
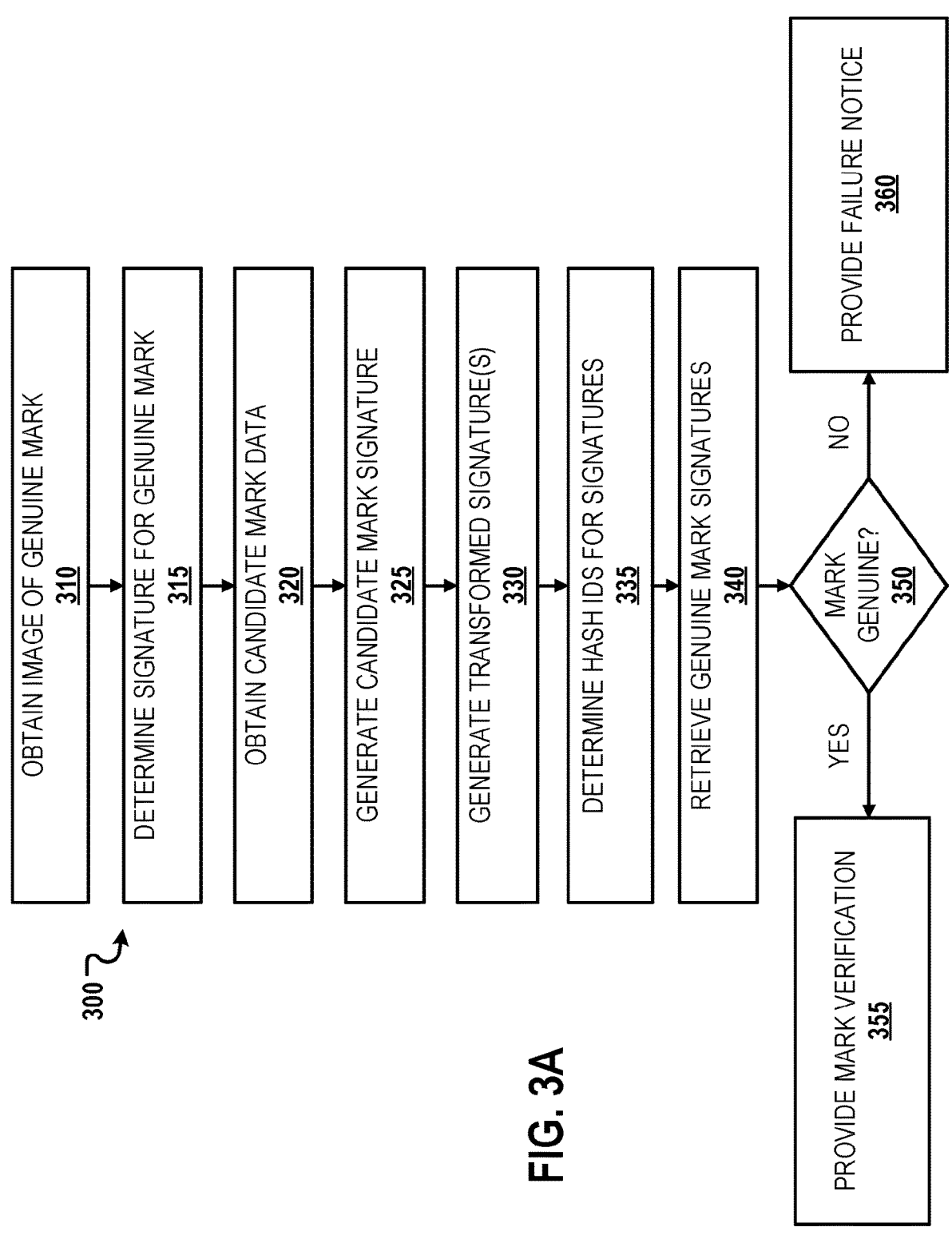
FIG. 3A shows a flow diagram of an example process for mark authentication with distortion tolerance.

FIG. 3A shows a flow diagram of an example process for mark authentication with distortion tolerance. For convenience, the process 300 will be described as being performed by a system for mark authentication with distortion tolerance, e.g., the mark authentication with distortion tolerance system of FIG. 1B, appropriately programmed to perform the process. Operations of the process 300 can also be implemented as instructions stored on one or more computer readable media which may be non-transitory, and execution of the instructions by one or more data processing apparatus can cause the one or more data processing apparatus to perform the operations of the process 300. One or more other components described herein can perform the operations of the process 300. The process 300 authenticates a candidate mark in an image using a distortion accommodation process that transforms a data series of an electronic signature for the candidate mark, as described further below.

Figure 3B:
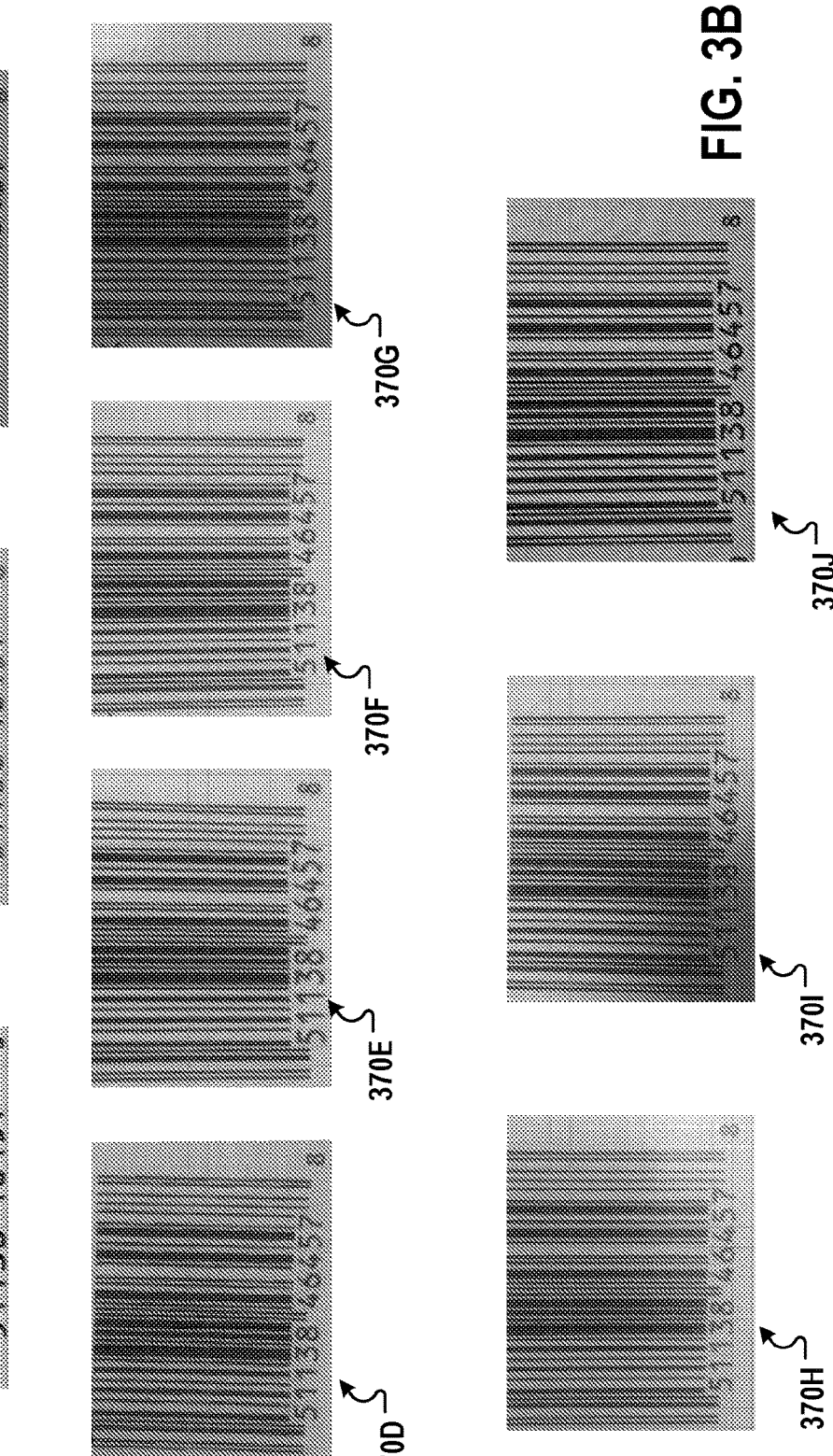
FIG. 3B shows example mark distortions.

As background, FIG. 3B shows example mark distortions. The process 300 is configured to correct for such distortions, which can occur when images of the mark are taken in uncontrolled environments, such as when the image is captured by a human user with a cell phone camera. The figure includes an image 370A of the mark taken at ambient light with no apparent distortions. The figure further includes distorted images of the mark taken with: low angle spotlight (370B); shadow and spotlight glare (370C); low angle light and rotation (370D); tilt (370E, 370F); shadow and diffuse glare (370G, 370H); shadow and tilt (3701); and low angle sidelight (370J).

Returning to FIG. 3A, the system can obtain (310) an image of a genuine mark. As described above, a first image-capturing device such as a camera, machine-vision device, scanner or other image-capture device, can capture an image of a genuine mark and transmit the captured image to a computing device in the system, e.g., by transmitting the mark over a network. In some implementations, obtaining (310) the image of the genuine mark involves simply receiving the image from another system or process, rather than actually doing the image capture directly.

The system can determine (315) an electronic signature for the genuine mark by generating the signature using measured characteristics of the image of the genuine mark. The system can determine the signature using the techniques described in reference to FIG. 1B or using similar techniques. For example, the system can measure and rank characteristics of the mark, and use metrics that reach a predetermined threshold as part of the signature. The system can store the signature in a persistent storage device.

The system can obtain (320) data describing a candidate mark, which can include the distortions described in reference to FIG. 3B or other image distortions. As described above, a second image-capturing device, which can be a camera, machine-vision device, scanner or other image capture device, can capture an image of a candidate mark and transmits the captured image to a second computing device. The second computing device can transmit the mark to the system, e.g., by transmitting the mark over a network. The obtaining (320) can involve capturing the image or receiving the image captured by another system or process.

The system can generate (325) a candidate mark signature. The system can use the techniques of operation 315. In some implementations, the system can receive the candidate mark signature instead of, or in addition to, generating the signature. For example, a computing device coupled to the system can generate the signature, and provide the signature to the system.

The system can generate (330) two or more transformed data series versions of the electronic signature by transforming data series values of the electronic candidate mark signature. The candidate signature and these transformed data series versions of the electronic signature can be called a "candidate signature set," and the candidate signature set can be used to determine the authenticity of the mark, as described further below.

In some implementations, the system can generate the transformed data series using predefined and/or configurable transformations. For example, the system can be configured to produce four transformed data series version of the signature by: (i) shifting the bits two places to the left; (ii) shifting the bits one place to the left; (iii) shifting the bits one place to the left; and (iv) shifting the bits two places to the right. This example was described in detail in reference to FIG. 2B. In some implementations, the system can include multiple transformation functions, and each transformation function can be associated with or approximate one or more distortion correction types, as described in reference to FIG. 3C below. Note that since distortions can be local to a portion of a mark, transformations can be applied to only a portion of the data series generated for a mark. For example, one transformation can be applied to the data series values representing a first portion of a mark, no transformation can be applied to the data series values representing a second portion of a mark, and a third transformation (which can be the same as, or different from, the second transformation) can be applied to the data values representing a third portion of the mark.

Figure 3C:
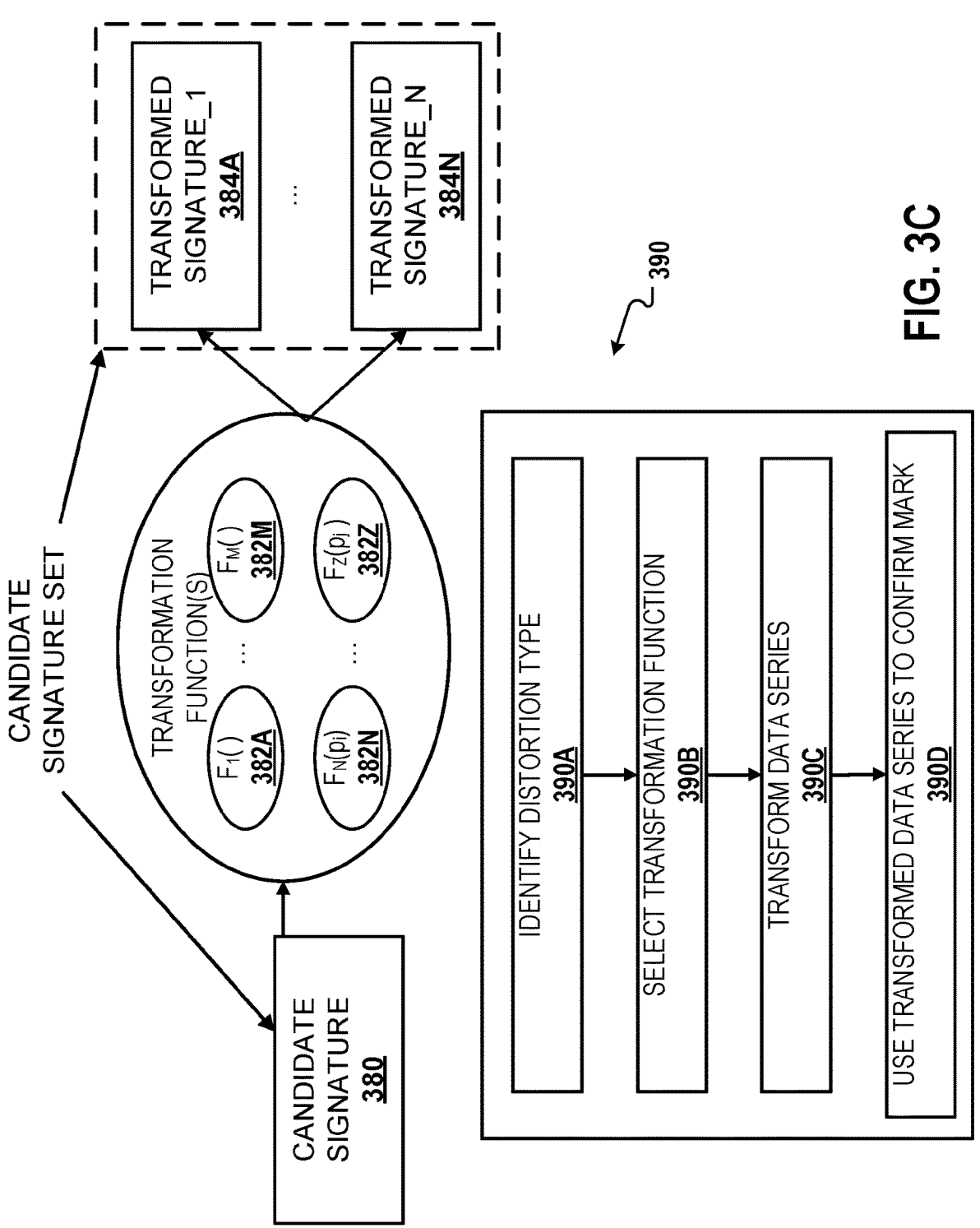
FIG. 3C shows a flow diagram and an example of creating transformed signatures in a system with multiple transformations.

As mentioned above, in some implementations, the system can include multiple transformations that are associated with or approximate one or more distortion correction types, and the system can apply a transformation based on the distortion type(s) present in the electronic signature. FIG. 3C shows a flow diagram and an example of creating transformed signatures in a system with multiple transformations. In the example, the system applies one or more transformation functions 382A . . . 382M, 382N . . . 382Z (collectively "transformations functions 382) to a candidate signature 380. The transformation functions 382 can include shifting, warping, stretching, scaling, performing a geometric operation, utilizing a lookup table of transformation values and/or other transformation functions. Some of the transformation functions (e.g., 382N . . . 382Z) can be parameterized. The result is transformed signature_1 384A to transformed signature_N 384N. The candidate signature 380 and the transformed signatures 384A, 384N form the candidate signature set.

Flow diagram 390 shows the process in more detail. Having obtained an electronic signature as a data series for a candidate mark (e.g., candidate signature 380) that has been generated from measured characteristics of an image of the candidate mark, the system identifies (390A) at least one distortion type in the electronic signature.

The system selects (390B) a transformation function based on the identified particular distortion type. In some implementations, the system can include a mapping from distortion types to transformation functions. For example, according to the mapping, the system can apply a first transformation if the signature indicates glare, a second transformation if the signature indicates rotation and a third transformation if the signature indicates tilt. In some implementations, the system can apply multiple transformations based on the distortion type(s) present. For example, if the signature indicates glare and rotation, the system can apply the first and second transformations.

The system transforms (390C) the data series utilizing the selected transformation function to generate at least one transformed data series, e.g., using the techniques of step 330 of FIG. 3A. The system can utilize (390D) the data series and the transformed data series to confirm the candidate mark is genuine, e.g., as described below in reference to step 350. The result of applying the transformation(s) is one or more transformed data series, and these transformed data series, together with the data series (that is, the signature) for the original candidate mark, can be added to the candidate signature set.

Figure 4:
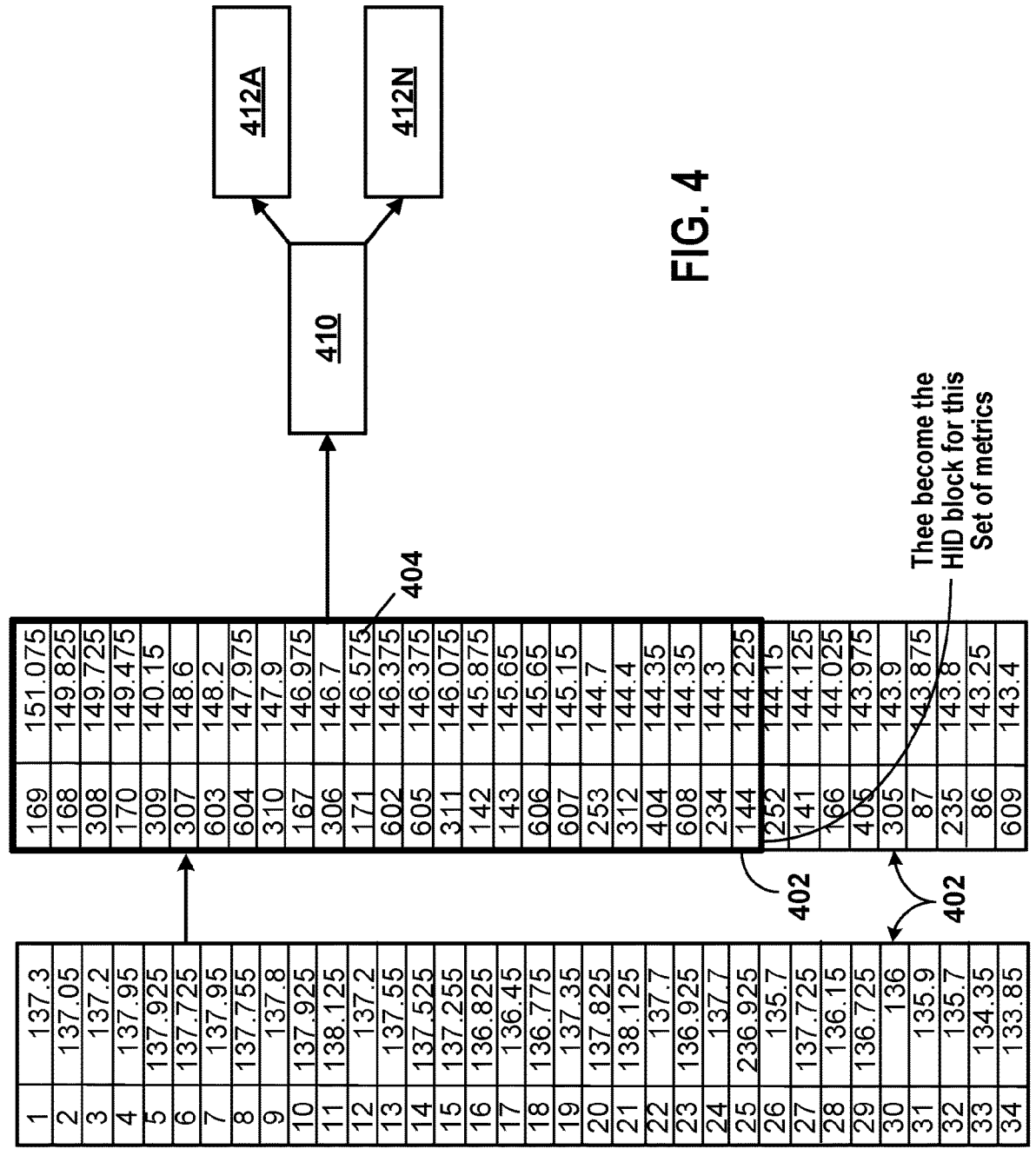
FIG. 4 shows an example of how a computing device sorts a set of metrics and selects the location identifiers of a subset of the metrics.
Figure 5:
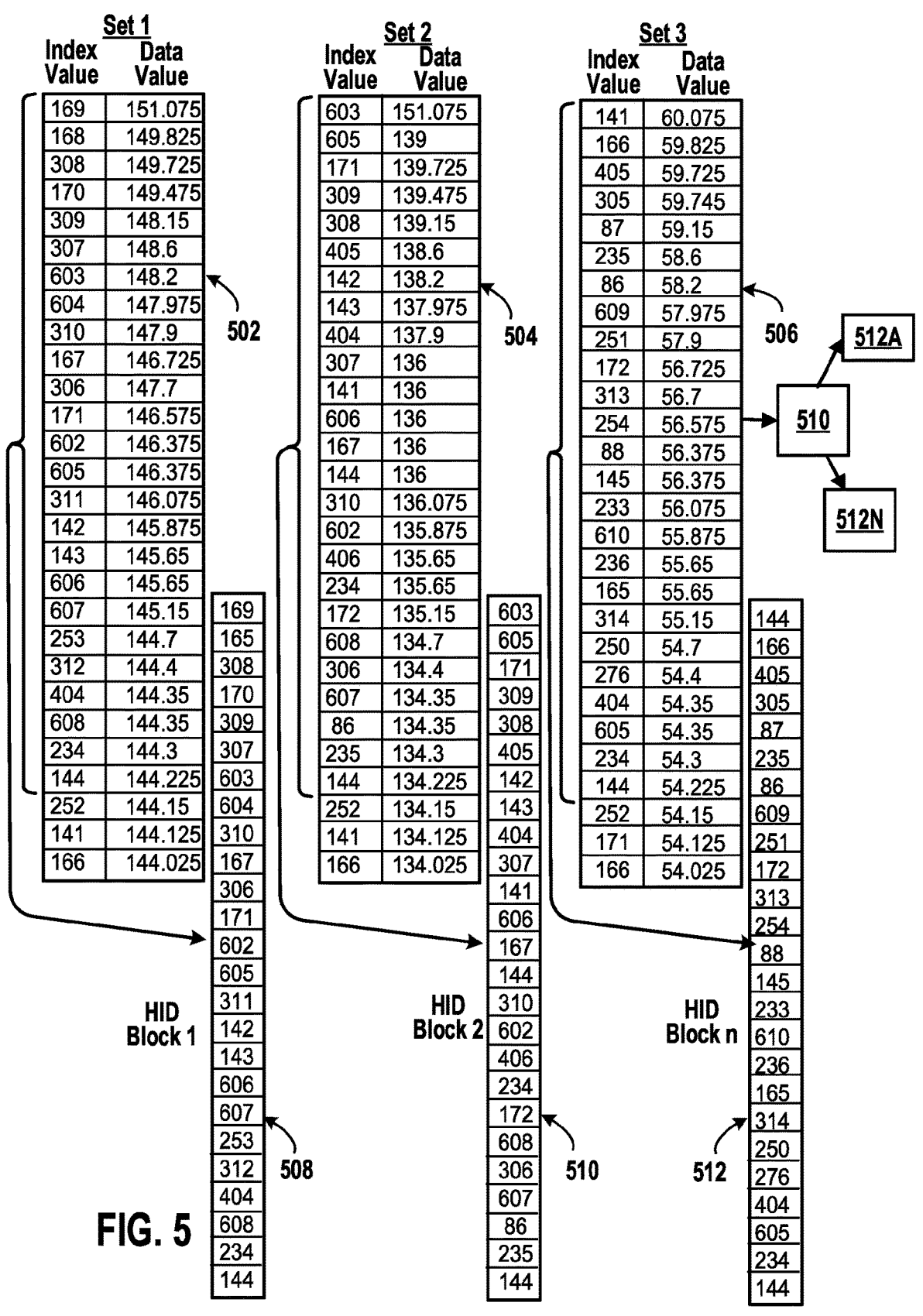
FIG. 5 shows an example of how a computing device forms hash identifier blocks from location identifiers corresponding to multiple subsets of metrics.

Returning to FIG. 3A, the system can determine (335) hash identifiers (HIDs) for the signatures in the candidate signature set. Turning to FIG. 4 and FIG. 5, the techniques that a computing device can use determine a HID from a signature (including a signature determined by transforming the candidate signature) by identifying a subset of the highest magnitude metrics of the electronic signature for a mark and deriving a HID from the location identifiers associated with the subset are described.

For each measured characteristic (and for each set of metrics for a characteristic in those cases where a characteristic is measured multiple times) the computing device can take the set of metrics that make up part of an electronic signature and sort the set by value. In FIG. 4, for example, a first set 402 of metrics (depicted as a list) represents the pigmentation for various cells of a 2D barcode, with each cell having an associated index number. The data for each cell is unitless at this point, but when the computing device originally took the pigmentation measurement, it did so in terms of gray value. The first set 402 is just one of multiple sets of metrics that make up the electronic signature for the 2D barcode. The computing device sorts the first set 402 by the magnitude of the data value and extracts a subset 404 of index numbers corresponding to a subset of the highest-magnitude data values. The computing device then makes the subset 404 of index values an HID block for the first set 402 of metrics. Once the complete HID has been created, a transformer 410 can apply a transformation function to create transformed signatures 412A, 412N, as described further below.

In another example, in FIG. 5, a first set 502 of metrics corresponds to a first characteristic of the mark (e.g., the genuine mark or the candidate mark), a second set 504 of metrics corresponds to a second characteristic of the mark, and a third set 506 of metrics (the "nth set" or final set) corresponds to a third characteristic of the mark. There can be any number of sets of metrics, however. Each member of each set of metrics in this example includes (1) an index value, which correlates with the raster position of the subarea of the mark from which a measurement of the characteristic was obtained, and (2) a data value, which is a magnitude that is either the measurement itself or is derived from the measurement (e.g., after some statistical processing and normalization). The computing device sorts each set of metrics by data value. For each set of metrics, the computing device extracts the index values corresponding to a highest-magnitude subset of the data values. In this example, each highest-magnitude subset is the top twenty-five data values of a set of metrics. The computing device derives a first HID block 508 from the index values corresponding to the highest-magnitude subset of the first set 502 of metrics. The computing device similarly derives a second HID block 510 from the index values corresponding to the highest-magnitude subset of the second set 504 of metrics. The computing device continues this process until it has carried out this process for each of the sets of metrics (i.e., through the nth set 506 of metrics to derive a third or "nth" HID block 512), resulting in a set of HID blocks. The computing device forms the HID by aggregating the HID blocks. In this example, the HID blocks contain the extracted index values themselves. As described above, once the complete HID has been created, a transformer 510 can apply a transformation function to create transformed signatures 512A, 512N, as described further below.

Figure 6:
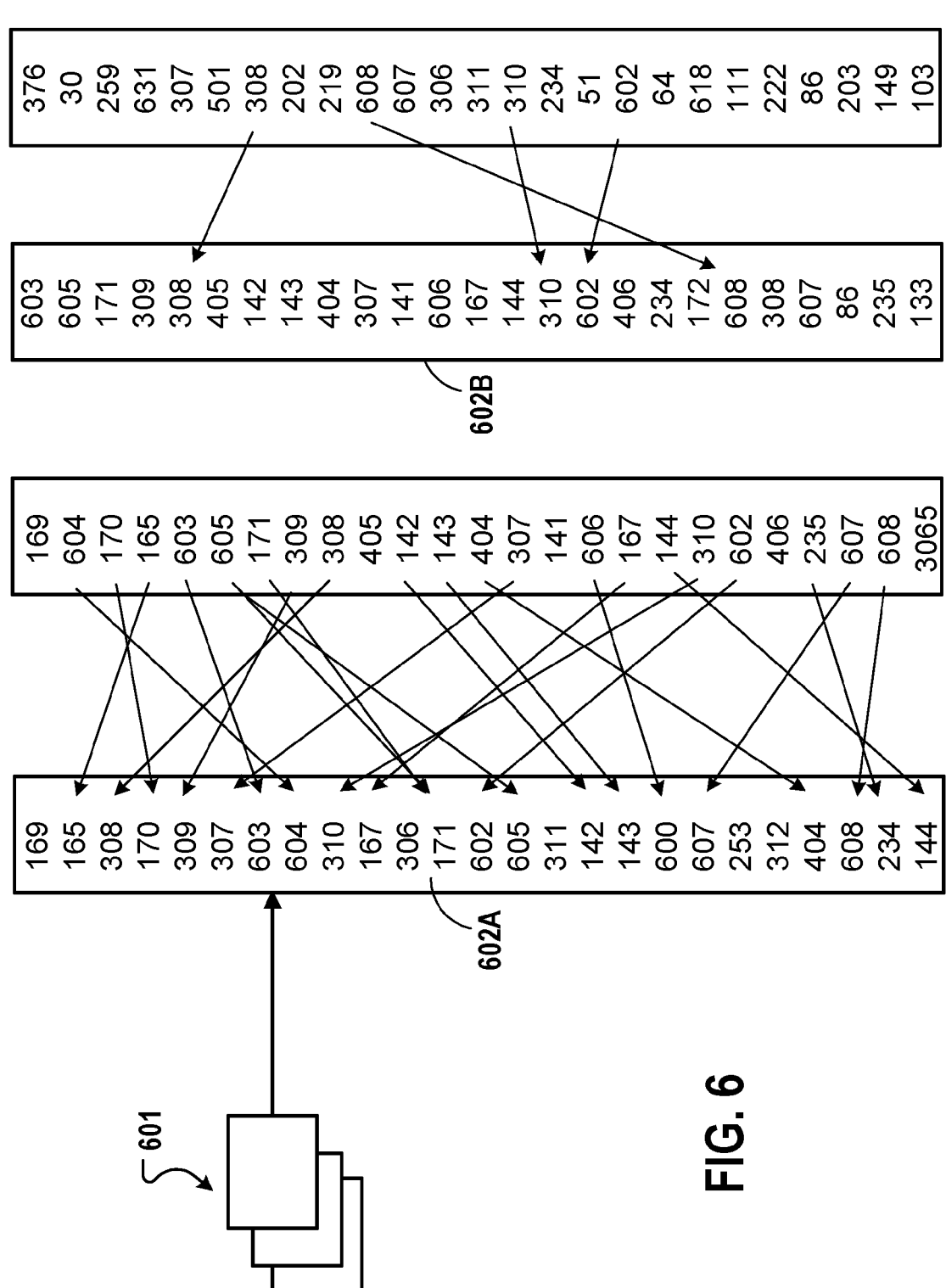
FIG. 6 shows an example of how a computing device compares two hash-identifier blocks and scores the results of the comparison.

Returning to FIG. 3A, the system can retrieve (340) genuine mark signatures using the HIDs determined in step 335. FIG. 6 shows an example of how a computing device can compare an overall HID 602A, 602B of a genuine mark with that of a candidate mark. The computing device can take each individual HID block of an HID value of a genuine signature, compare it to the corresponding block of an HID value of a candidate signature, and assign a match score. The computing device can then combine each of the scores into an overall match score. In general, if the overall match score meets or exceeds a predetermined threshold score, then the computing device deems the HIDs to be closely matched. For example, the computing device can use a predetermined threshold score of 20, meaning that if the score is 20 or more, then the computing device deems the two HIDs to be closely matching. This threshold can be as low as zero, e.g., when matching scores can be negative numbers. In the example of FIG. 6, HID 602A has a matching score of 21 and HID 602B has a matching score of 4, so HID 602A has the maximum matching score, and since that matching score also exceeds the threshold, HID 602A can be included in the results retrieved from the database. In some implementations, the computing device disregards the minimum and simply considers the top N HID scores (e.g., the top 10 if N is 10). In such a case, the computing device would consistently be performing a test on the top 10 best HID matches. This addresses the possibility of having an inaccurate HID cutoff and thereby generating a false negative through the filtering step (at the expense of unnecessary computations on actual non-genuine candidates). The computing device then retrieves the signature associated with the genuine HID value. The computing device repeats this process until it has compared the candidate HID value with a number (perhaps all) of the HID values stored in a database of genuine mark signatures. The outcome of this process will be a subset of the whole set of genuine mark signatures, each of which the computing device can then compare (e.g., using "brute force" comparison) to the signature of the candidate mark. The computing device can further perform this comparison for all HIDs 601 derived from the candidate signature set.

There are various ways by which one or more of the computing devices described herein can compare electronic signatures (e.g., of a candidate mark and a genuine more) with one another. In some implementations, the computing device compares one electronic signature (e.g., of a candidate mark) with another electronic signature (e.g., of a genuine mark) using direct numerical correlation. For example, the computing device array-index can match the raw sets of metrics of the two marks for each characteristic. The computing device can also subject each raw set of the genuine mark to normalized correlation to a like-order extracted metric set from a candidate mark. The computing device can then use the correlation results to arrive at a match/no match decision (genuine vs. counterfeit).

In another example, the computing device can compare a candidate signature with a genuine signature through the use of autocorrelation, such as by comparing the autocorrelation series of the sorted metrics of the candidate mark with the autocorrelation series of the (stored) sorted genuine signature. For clarity, the well-known statistical operation:

$$r_{xy} = \frac{n\sum x_i y_i - \sum x_i \sum y_i}{\sqrt{n\sum x_i^2 - \left(\sum x_i\right)^2}\ \sqrt{n\sum y_i^2 - \left(\sum y_i\right)^2}}$$

is the common Normalized Correlation Equation, where r is the correlation result, n is the length of the metric data list, and x and y are the metrics data sets for the genuine mark and the candidate mark, respectively. When the computing device carries out the autocorrelation function, the data sets x and y are the same.

To produce the autocorrelation series, in some implementations, the computing device can carry out the operation set forth in the Normalized Correlation Equation multiple times, each time offsetting the series x by one additional index position relative to the series y (remembering that y is a copy of x). As the offset progresses, the data set "wraps" back to the beginning as the last index in the y data series is exceeded due to the x index offset. In some implementations, the computing device accomplishes this by doubling the y data and "sliding" the x data from offset 0 through offset n to generate the autocorrelation series.

In some implementations, instead of storing the entire signature in the media storage device, the computing device instead stores a set of polynomial coefficients that describe (to a predetermined order and precision) a best-fit curve matching the shape of the autocorrelation results. This is feasible because the computing device carries out the process of generating the signature on sorted metrics data and, as a result, the autocorrelation series for the characteristic data (i.e., the metrics that help represent the artifacts within the genuine mark) is typically a simple polynomial curve.

Figures 7, 8:
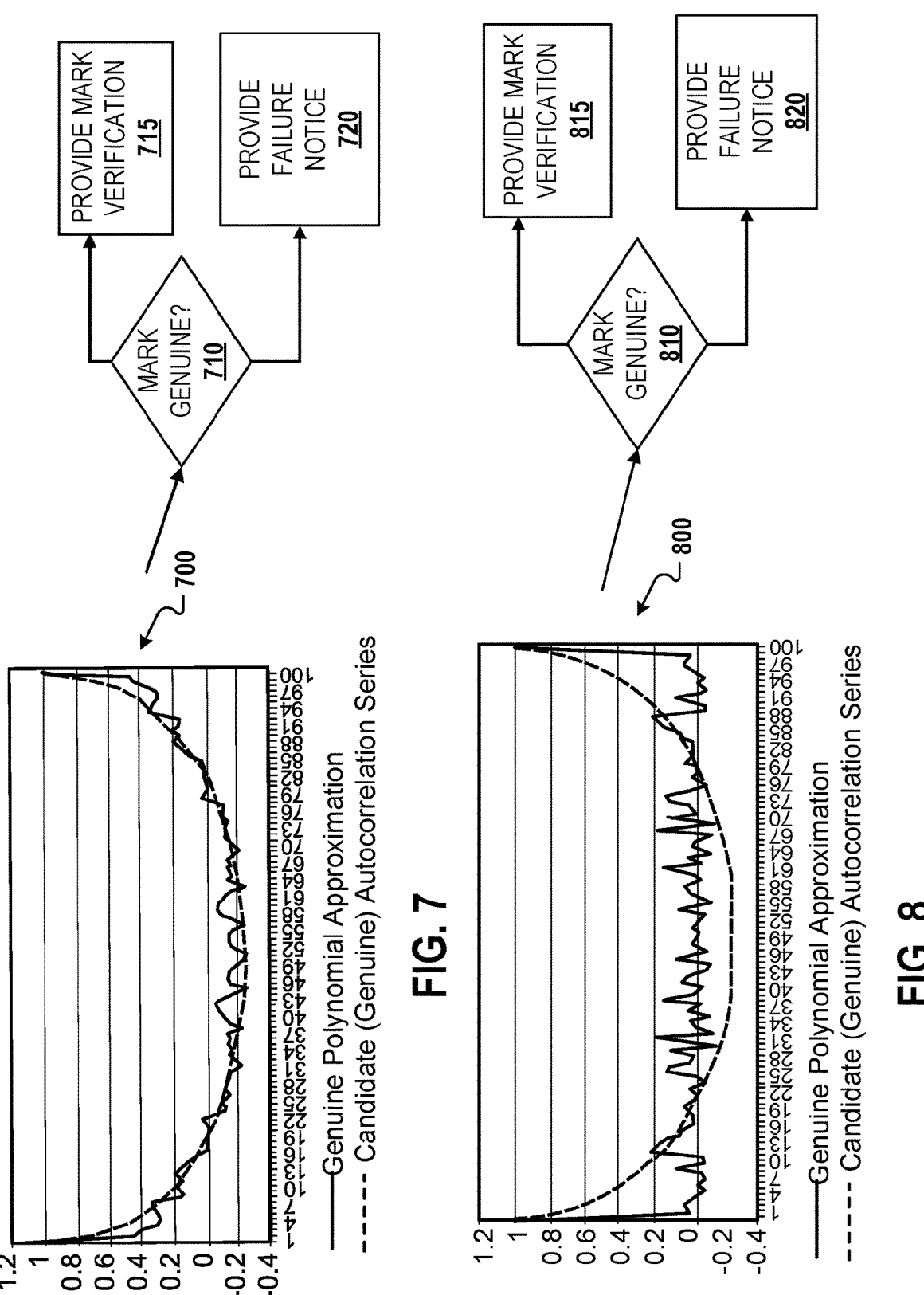
FIGS. 7 and 8 illustrate the process that a computing device carries out to convert the degree of correlation between the two sets of autocorrelated values for a given characteristic (or given set of metrics for a characteristic) to a match score for that characteristic or set of metrics.

In some implementations, a computing device can compute $r_{xy}$, where each term $x_i$ is an artifact represented by its magnitude and location, and each term $y_j = x_{(i+i)}$, where j is the offset of the two datasets, for j=0 to (n−1). Because the $x_i$ are sorted by magnitude, and the magnitude is the most significant digits of $x_i$, there is a very strong correlation at or near j=0, falling off rapidly towards j=n/2. Because y is a copy of x, j and n−j are interchangeable, the autocorrelation series forms a U-shaped curve, an example 700 of which is shown in FIG. 7, which is necessarily symmetric about j=0 and j=n/2. Thus, the computing device in this implementation need only calculate half of the curve, although in FIG. 7, the whole curve from j=0 to j=n is shown for clarity.

In some implementations, a computing device can use the actual autocorrelation numbers, then repeat the process on the candidate mark using the polynomial-modeled curve. In practice, it has been found that a 6th-order equation using six-byte floating-point values for the coefficients will tend to match the genuine signature data within a one percent curve fit error or "recognition fidelity." The resulting match scores that the computing device obtains may be within one percent of one another. This can be true of both the high match score (as would be expected if the candidate mark was genuine) and of a low match score (as would be expected if the candidate mark was not genuine).

In some implementations, a computing device that analyzes metrics of a mark for the purpose of generating an electronic signature can bound and normalize the metrics that it uses to generate the signature. For example, the computing device can express the polynomial coefficients to a fixed precision, express the autocorrelation data itself as values between −1 and +1, and use, as the sort order list, the array index location within the analyzed mark (genuine or candidate). If the mark being analyzed is a 2D data matrix, the array index can be a raster-ordered index of cell position within the mark, ordered from the conventional origin datum for the symbology being used. In one common type of 2D data matrix, the origin is the point where two solid bars bounding the left and bottom sides of the grid meet.

In some implementations, a computing device can compare (attempt to match) the genuine signature with the candidate signature as follows. The computing device can reconstitute the signatures using the stored polynomial coefficients, autocorrelate the metrics in each list (i.e., for each characteristic measured) to generate polynomial coefficients, and compare the two sets of polynomial coefficients (compares the two autocorrelation series). The computing device can carry out this comparison in a number of ways. For example, the computing device can attempt to correlate the autocorrelation series of the candidate mark against the (reconstituted) autocorrelation curve of the signature of the genuine mark. Alternatively or additionally, the computing device can construct a curve for each of the autocorrelation series (candidate and genuine) and perform a curve-fit error on the pair of curves, e.g., curve 700 of FIG. 7 and curve 800 of FIG. 8. The degree of correlation between the two sets of autocorrelated values for a given characteristic (or given set of metrics for a characteristic) becomes a match score for that characteristic or set of metrics.

In some implementations, a computing device that analyzes metrics of a mark for the purpose of generating an electronic signature can apply a power series analysis to the autocorrelation data for the candidate mark and to the autocorrelation data for the genuine mark. The computing device can apply such a power series analysis using a discrete Fourier transform ("DFT"):

$$X_k = \sum_{n=0}^{N-1} x_n e^{-i2\pi kn/N}$$

where $X_k$ is the $k^{th}$ frequency component, N is the length of the list of metrics, and x is the metrics data set. The computing device can calculate the power series of the DFT, analyze each frequency component (represented by a complex number in the DFT series) for magnitude, and discard the phase component. The resulting data describes the distribution of the metric data spectral energy, from low to high frequency, and it becomes the basis for further analysis.

In some implementations, a computing device that analyzes metrics of a mark for the purpose of generating an electronic signature can use two frequency-domain analytics: Kurtosis and Distribution Bias. In this context, Distribution Bias refers to a measure of energy distribution around the center band frequency of the total spectrum. To carry out Kurtosis, the computing device can use the following equation:

$$kurtosis = \frac{\sum_{n=1}^{N} (Y_n - \overline{Y})^4}{N(N-1)s^4}$$

where Y is the mean of the power series magnitude data, s is the standard deviation of the magnitudes, and N is the number of analyzed discrete spectral frequencies.

To calculate the Distribution Bias in some implementations, the second computing device can use the following equation:

$$Distribution\ Bias = \frac{\sum_{n=0}^{(\frac{N}{2})-1} x_n - \sum_{n=N/2}^{N} x_n}{\sum_{n=0}^{N} x_n}$$

where N is the number if analyzed discrete spectral frequencies. When using frequency-domain analytics (e.g., using the DFT), in some implementations, a computing device considers the following criteria: The smooth polynomial curve of the signature of a genuine mark (arising from the by-magnitude sorting) yields recognizable characteristics in the spectral signature when analyzed in the frequency domain. A candidate mark, when the metrics data are extracted in the same order as those extracted from the genuine mark, will present a similar spectral energy distribution if the symbol is genuine. In other words, the genuine sort order "agrees" with the candidate's metric magnitudes. Disagreement in the sorted magnitudes, or other superimposed signals (such as photocopying artifacts), tend to show up as high-frequency components that are otherwise absent in the genuine symbol spectra, thus providing an additional measure of mark authenticity. This addresses the possibility that a counterfeit autocorrelation series might still satisfy the minimum statistical match threshold of the genuine mark. The distribution characteristics of the DFT power series of such a signal will reveal the poor quality of the match via the high frequencies present in the small amplitude match errors of the candidate series. Such a condition can be indicative of a photocopy of a genuine mark. In particular, the computing device deems a high Kurtosis and a high Distribution Ratio to be present in the spectra of a genuine mark. In some implementations, the computing device uses this power series distribution information in conjunction with the match score as a measure of confidence in the verification of a candidate mark.

The computing device can then determine whether the candidate mark is genuine based on all of the match scores for the various characteristics. In FIG. 7, the score can be used to determine (710) whether the mark is genuine, e.g., using the operations of step 350 of FIG. 3A. If the mark is genuine, a mark verification can be provided (715), e.g., using the operations of step 355 of FIG. 3A; if the mark is not genuine, a failure notice can be provided (720), e.g., using the operations of step 360 of FIG. 3B. The same technique is shown in FIG. 8, where the score can be used to determine (810) whether the mark is genuine. If the mark is genuine, a mark verification can be provided (815); if the mark is not genuine, a failure notice can be provided (820). Steps 350, 355 and 360 are described below.

Returning to FIG. 3A, the system can determine (350) whether the candidate mark is genuine by using the data series and the transformed data series, i.e., the candidate signature set, and comparing the data series to genuine marks, as described above. For example, the system can compare at least one electronic signature of a genuine mark that was retrieved from the stored set of genuine marks.

In some implementations, the system uses the HIDs to retrieve multiple results from a database of genuine mark signatures. For example, the system can retrieve the N genuine results that are most likely to match the candidate mark, e.g., those having the maximum matching scores as compared to the values in the candidate signature set. Note that N can be one (matching only to the most likely genuine mark) or greater than one (matching to multiple genuine marks). Once such genuine marks are retrieved, the system can compare the signatures in the candidate signature set instead of, or in addition to, comparing HIDs. Comparing signatures can provide more accurate comparisons.

If the mark is genuine, the system can provide (355) a mark verification, and if the mark is not genuine, the system can provide (360) a failure notice. In either case, the system can display the result on a user interface or record it in a log file.

Figure 9:
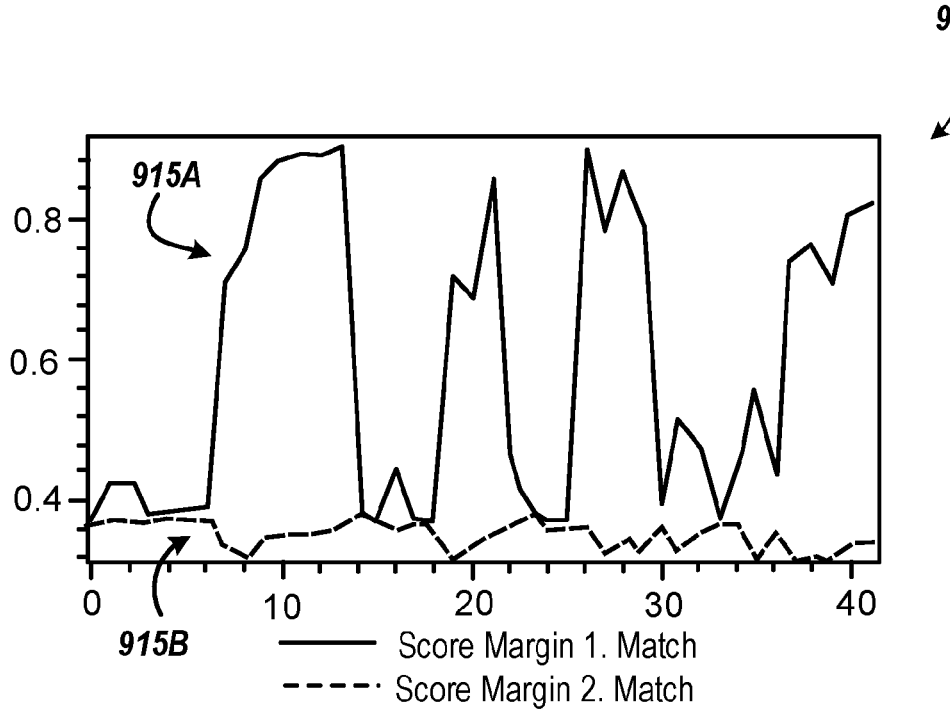
FIGS. 9 and 10 shows example results of applying transformation functions.
Figure 9:
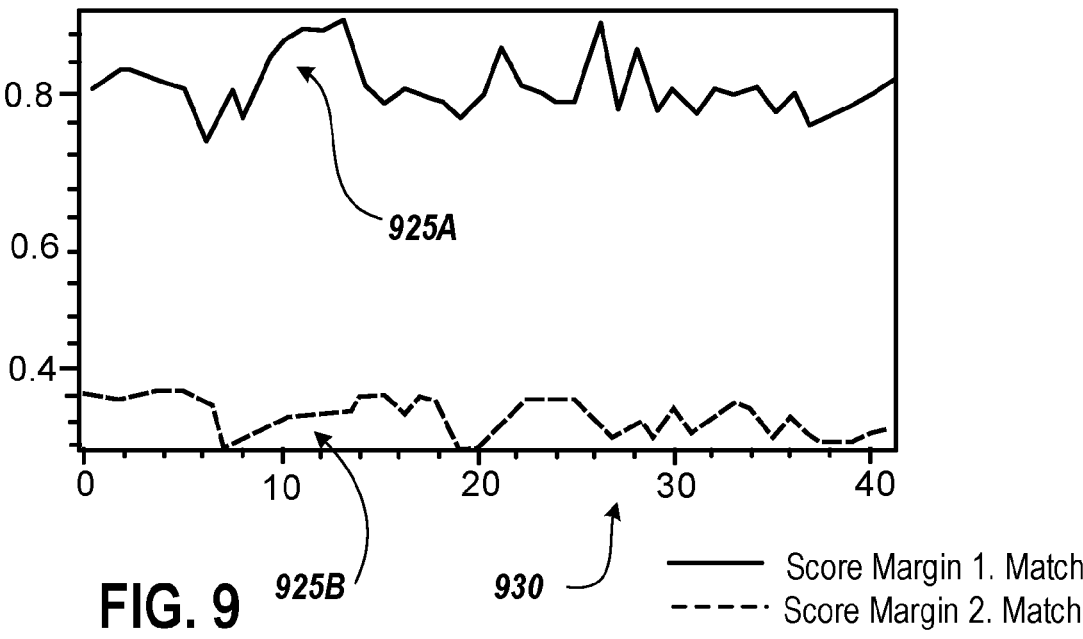
Figure 10:
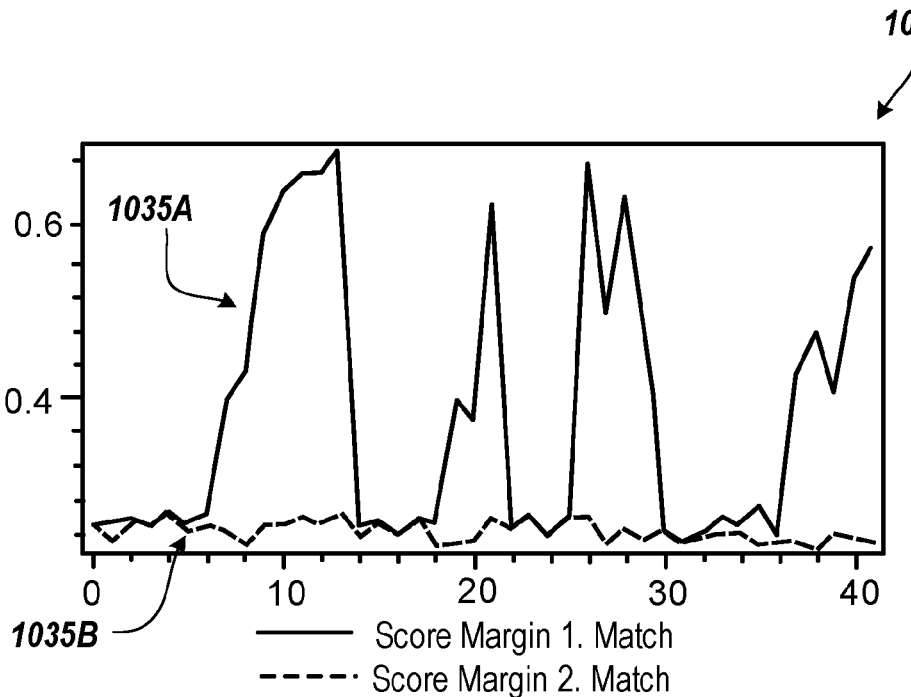
Figure 10:
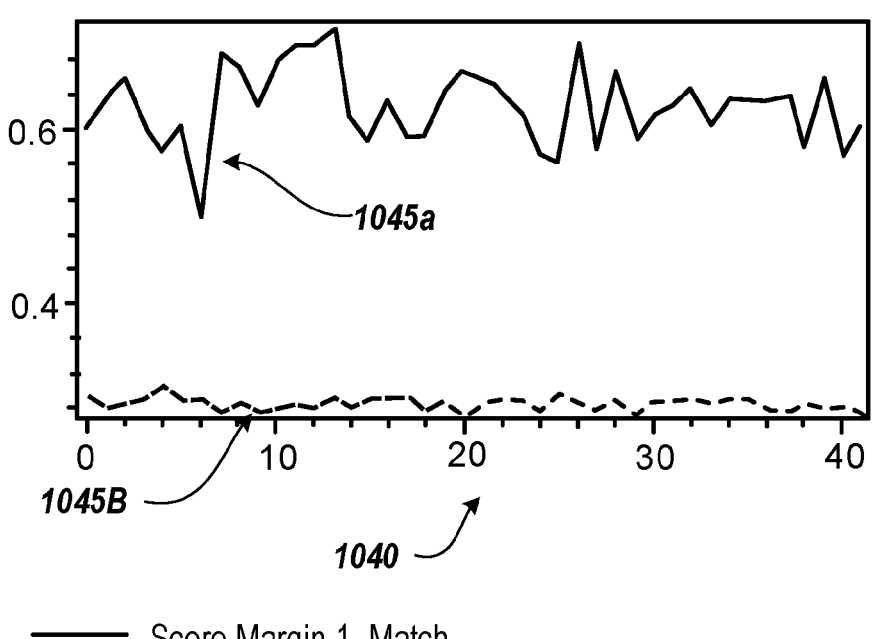

FIGS. 9 and 10 show example results of applying transformation functions. In FIG. 9, a first graph 910 shows the results of comparing signatures to marks with various distortions. Lines 915A and 915B show the similarity between scores for signatures of genuine marks (915A) and the signatures for the next best matches (915B), with each point on a line scores for signatures of one mark. (E.g., the points at 9 on the X-axis are results for the $9^{th}$ sample.) In graph 910, no shift correction is applied, and for some samples, e.g., 3, 4 and 12, the lines intersect or nearly intersect, indicating that the system will be unable to differentiate authentic and counterfeit marks.

In graph 920, the lines 925A and 925B again show the similarity between scores for genuine marks (925A) and the next best match (925B), but shift correction has been applied. In this case, genuine samples 925A are strongly differentiated from the next best matches 925B.

In FIG. 10, graphs 1030 and 1040 show the same data, but for HIDs for the signatures instead of for the signatures themselves. As above, for the untransformed data (graph 1030), the scores 1035A for the authentic samples intersect or nearly intersect with the scores 1035B for the next best matches. In contrast, for transformed data (graph 1040), the scores 1045A for the authentic samples are strongly differentiated from the scores 1035B for the next best matches, indicating that authentic samples can properly be differentiated from counterfeit samples.

Figure 11:
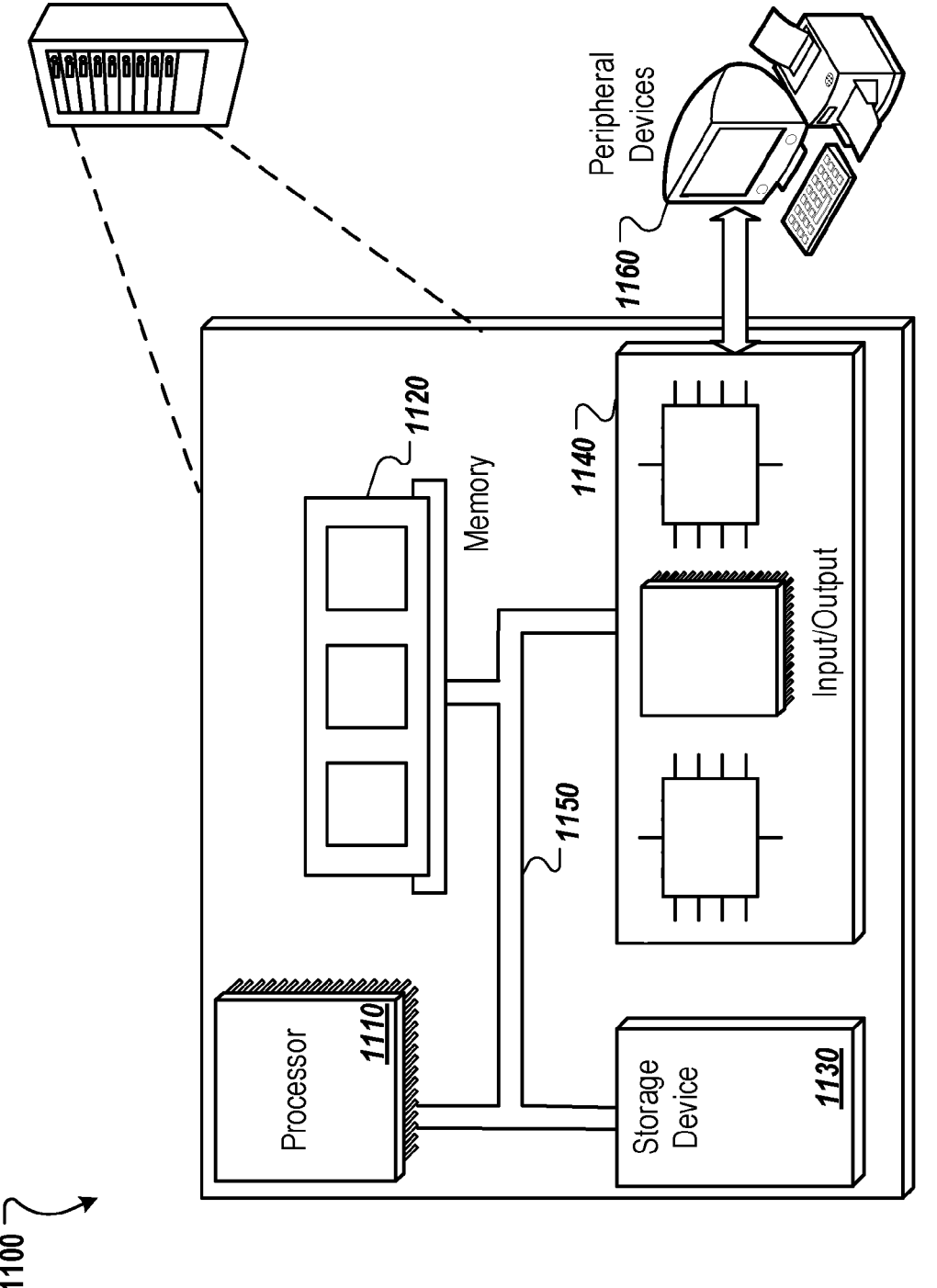
FIG. 11 is a block diagram of an example computer system.

FIG. 11 is a block diagram of an example computer system 1100 that can be used to perform operations described above. The system 1100 includes a processor 1110, a memory 1120, a storage device 1130, and an input/output device 1140. Each of the components 1110, 1120, 1130, and 1140 can be interconnected, for example, using a system bus 1150. The processor 1110 is capable of processing instructions for execution within the system 1100. In some implementations, the processor 1110 is a single-threaded processor. In another implementation, the processor 1110 is a multi-threaded processor. The processor 1110 is capable of processing instructions stored in the memory 1120 or on the storage device 1130.

The memory 1120 stores information within the system 1100. In some implementations, the memory 1120 is a computer-readable medium. In some implementations, the memory 1120 is a volatile memory unit. In another implementation, the memory 1120 is a non-volatile memory unit.

The storage device 1130 is capable of providing mass storage for the system 1100. In some implementations, the storage device 1130 is a computer-readable medium. In various different implementations, the storage device 1130 can include, for example, a hard disk device, an optical disk device, a storage device that is shared over a network by multiple computing devices (e.g., a cloud storage device), or some other large capacity storage device.

The input/output device 1140 provides input/output operations for the system 1100. In some implementations, the input/output device 1140 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1160. Other implementations, however, can also be used, such as mobile computing devices, mobile communication devices, set-top box television client devices, etc.

Although an example processing system has been described in FIG. 11, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented using one or more modules of computer program instructions encoded on a computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular implementations of the disclosed subject matter. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the implementations described above can be combined with any of the other features of the implementations described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A system comprising:
   a user interface device; and
   one or more computers operable to interact with the user interface device, characterized in that the one or more computers are programmed to perform operations in accordance with machine-readable instructions, the operations comprising
   obtaining an electronic signature for a candidate mark in an image, using a distortion accommodation process that transforms a data series of the electronic signature for the candidate mark to obtain a transformed data series of the electronic signature that corrects distortion of values in the data series of the electronic signature for the candidate mark, and authenticating the candidate mark using the transformed data series of the electronic signature for the candidate mark and a data series of an electronic signature of a genuine mark.

2. The system of claim 1, wherein the distortion accommodation process utilizes a plurality of transformation functions, and wherein each transformation function approximates a particular distortion correction type.

3. The system of claim 1, wherein the data series is a vector of numbers, and wherein the numbers are in a data type comprising at least one of bits, bytes, floats, doubles, hex numbers, or other data representations.

4. The system of claim 1, wherein a transformation function of the distortion accommodation process includes at least one of shifting, warping, stretching, scaling, performing a geometric operation, or utilizing a lookup table of transformation values.

5. The system of claim 4, wherein the one or more computers are programmed to select a transformation function enabling approximate correction of targeted distortions to be removed from the data series.

6. The system of claim 4, wherein the transformation function is parameterized and applied two or more times with two or more parameter values, enabling approximate correction of targeted distortions to be removed from the data series.

7. The system of claim 6, wherein when the transformation function is a shift, and a parameter of the parameterization is the number of data series positions to shift.

8. The system of claim 4, wherein the transformation function maps data series elements from one value to another value within a same vector space.

9. The system of claim 8, wherein a fingerprint is a data series member of the vector space.

10. The system of claim 1, wherein the electronic signature is generated from measured characteristics of the image of the candidate mark; wherein using the distortion accommodation process comprises transforming data series values of the electronic signature to generate two or more transformed data series versions of the electronic signature; and wherein the authenticating comprises:

deriving hash identifiers for the electronic signature and for the two or more transformed data series versions of the electronic signature;

using the hash identifiers to retrieve a set of two or more results from a database of genuine mark signatures; and comparing at least one electronic signature retrieved for at least one of the two or more results from the database with the electronic signature for the candidate mark to confirm the candidate mark is genuine.

11. The system of claim 10, wherein the transforming comprises performing a data series shift a number of spots in at least one direction, performed a particular number of times to create at least four transformed data series versions of the electronic signature.

12. The system of claim 10, wherein the at least one of the two or more results is one of the two or more results having a maximum matching score.

13. The system of claim 10, wherein the obtaining comprises:

receiving the image of the candidate mark;

measuring the characteristics to produce a set of metrics for the characteristics; and generating the electronic signature based on the set of metrics.

14. The system of claim 10, wherein the one or more computers comprise a server operable to interact with the user interface device through a data communication network, and the user interface device is operable to interact with the server as a client.

15. The system of claim 10, wherein the user interface device comprises a personal computer, or a mobile device, or a mobile telephone running a web browser.

16. The system of claim 10, wherein the one or more computers comprise one personal computer, and the personal computer comprises the user interface device.

17. A method comprising:

obtaining an electronic signature as a data series for a candidate mark, the electronic signature being generated from measured characteristics of an image of the candidate mark;

identifying at least one particular distortion type in the electronic signature;

selecting a transformation function from a plurality of transformation functions based on the identified at least one particular distortion type;

transforming the data series utilizing the selected transformation function to generate at least one transformed data series in which distortion in data series values has been corrected for the identified at least one particular distortion type; and utilizing the data series and the transformed data series to confirm the candidate mark is genuine.

18. A non-transitory computer-readable medium tangibly encoding a computer program operable to cause data processing apparatus to perform operations comprising:

obtaining an electronic signature as a data series for a candidate mark, the electronic signature being generated from measured characteristics of an image of the candidate mark;

identifying at least one particular distortion type in the electronic signature;

selecting a transformation function from a plurality of transformation functions based on the identified at least one particular distortion type;

transforming the data series utilizing the selected transformation function to generate at least one transformed data series in which distortion in data series values has been corrected for the identified at least one particular distortion type; and utilizing the data series and the transformed data series to confirm the candidate mark is genuine.

* * * * *